(12) United States Patent
Kobayashi et al.

(10) Patent No.: US 11,488,056 B2
(45) Date of Patent: Nov. 1, 2022

(54) LEARNING PROGRAM, LEARNING APPARATUS, AND LEARNING METHOD

(71) Applicant: FUJITSU LIMITED, Kawasaki (JP)

(72) Inventors: Teruya Kobayashi, Shibuya (JP); Ryuichi Takagi, Nakano (JP)

(73) Assignee: FUJITSU LIMITED, Kawasaki (JP)

( * ) Notice: Subject to any disclaimer, the term of this patent is extended or adjusted under 35 U.S.C. 154(b) by 701 days.

(21) Appl. No.: 16/133,833

(22) Filed: Sep. 18, 2018

(65) Prior Publication Data

US 2019/0102699 A1 Apr. 4, 2019

(30) Foreign Application Priority Data

Oct. 4, 2017 (JP) .............................. JP2017-193933

(51) Int. Cl.
*G06N 20/00* (2019.01)

(52) U.S. Cl.
CPC ..................................... *G06N 20/00* (2019.01)

(58) Field of Classification Search
CPC ....................................................... G06N 20/00
See application file for complete search history.

(56) References Cited

U.S. PATENT DOCUMENTS 10,255,550 B1 * 4/2019 Simkoff ................. G06N 7/005
10,332,508 B1 * 6/2019 Hoffmeister ........... G06N 3/084

| | | | |
|---|---|---|---|
| 2003/0220772 A1 | 11/2003 | Chiang et al. | |
| 2006/0015829 A1 | 1/2006 | De Smedt et al. | |
| 2011/0078099 A1 * | 3/2011 | Weston ................ | G06K 9/6231 706/12 |

(Continued)

FOREIGN PATENT DOCUMENTS

| JP | 2005-527034 | 9/2005 |
|---|---|---|
| JP | 2008-507038 | 3/2008 |
| JP | 2015-162113 | 9/2015 |

OTHER PUBLICATIONS

Gorodetsky et al., "Efficient Localization of Discontinuities in Complex Computational Simulations", Aug. 4, 2014, arXiv: 1402.2845v2, p. 1-24 (Year: 2014).*

(Continued)

*Primary Examiner* — Omar F Fernandez Rivas
*Assistant Examiner* — Selene A. Haedi
(74) *Attorney, Agent, or Firm* — Fujitsu Patent Center

(57) ABSTRACT

A non-transitory computer-readable storage medium storing therein a learning program that causes a computer to execute a process includes: determining whether or not there is a discontinuity point at which a variation in a learning time relative to a variation in a learning parameter is discontinuous; specifying, when the discontinuity point is present, ranges of the learning parameter in which the variation in the learning time relative to the variation in the learning parameter is continuous, based on the discontinuity point; calculating, for each of the specified ranges, an estimated value of performance of trials using a trial parameter learned by machine learning per a learning time of machine learning using a learning parameter included in the range; and specifying a learning parameter which enables any of the estimated values selected in accordance with a magnitude of the estimated value among the calculated estimated values.

7 Claims, 23 Drawing Sheets

(56) References Cited

U.S. PATENT DOCUMENTS

| | | | | |
|---|---|---|---|---|
| 2011/0295762 | A1* | 12/2011 | Scholz | G06Q 30/0282 |
| | | | | 705/347 |
| 2013/0346351 | A1* | 12/2013 | Lin | G06N 3/08 |
| | | | | 706/21 |
| 2015/0339572 | A1* | 11/2015 | Achin | G06Q 10/06 |
| | | | | 706/46 |
| 2016/0132787 | A1* | 5/2016 | Drevo | G06N 20/10 |
| | | | | 706/12 |
| 2016/0314392 | A1* | 10/2016 | Honkala | G06N 3/0445 |
| 2017/0116372 | A1* | 4/2017 | Baughman | G16B 40/00 |
| 2018/0060738 | A1* | 3/2018 | Achin | G06Q 10/04 |
| 2019/0197404 | A1* | 6/2019 | Wang | G06N 3/0454 |
| 2020/0090073 | A1* | 3/2020 | Zhan | G06N 20/00 |
| 2020/0143240 | A1* | 5/2020 | Baker | G06N 3/04 |
| 2020/0285939 | A1* | 9/2020 | Baker | G06N 3/0472 |

OTHER PUBLICATIONS

Malik et al., "Detecting Discontinuities in Large-Scale Systems", 2014, IEEE/ACM 7th International Conference on Utility and Cloud Computing, p. 345-354 (Year: 2014).*

Yuang et al., "Intelligent Video Smoother for Multimedia Communications", 1996, IEEE, p. 502-507 (Year: 1996).*

Jakeman et al., "Characterization of Discontinuities in High-Dimensional Stochastic Problems on Adaptive Sparse Grids", Feb. 22, 2011, Journal of Computational Physics, 230, p. 3977-3997 (Year: 2011).*

Roggero, "Discontinuity Detection and Removal from Data Time Series", May 29, 2014, ResearchGate (Year: 2014).*

Brochu et. al. "A Tutorial on Bayesian Optimization of Expensive Cost Functions, with Application to Active User Modeling and Hierarchical Reinforcement Learning", Dec. 2010 (Year: 2010).*

Snoek et. al., "Practical Bayesian Optimization of Machine Learning Algorithms", 2012 (Year: 2012).*

* cited by examiner

| ITEM NUMBER | MODEL NAME | PARAMETER NAME | VALUE | GENERATION TIME (h) | PERCENTAGE OF CORRECT ANSWERS (%) |
|---|---|---|---|---|---|
| 1 | md1 | p1 | 1 | 1.5 | 60 |
| 2 | md2 | p1 | 6 | 6 | 65 |
| 3 | md3 | p1 | 3 | 3 | 70 |
| 4 | md4 | p1 | 4 | 4 | 85 |

| ITEM NUMBER | QUESTION CONTENTS | ANSWER CONTENTS | CORRECT /INCORRECT |
|---|---|---|---|
| 1 | TELL ME PHONE NUMBER OF COMPANY A. | 03-xxxx-xxxx. | CORRECT |
| 2 | WHAT IS COMPANY A'S ADDRESS? | ADDRESS IS xxx, xxx CITY. | CORRECT |
| 3 | WHAT OS IS SUPPORTED BY PERSONAL COMPUTER MANUFACTURED BY COMPANY A? | B-OS. | CORRECT |
| 4 | WHAT IS POSTAL CODE FOR COMPANY A? | B-OS. | INCORRECT |
| 5 | WHERE IS COMPANY A'S FACTORY LOCATED? | xxx TOWN IN xxx PREFECTURE. | CORRECT |

| ITEM NUMBER | MODEL GROUP NAME | PARAMETER NAME | VALUE | GENERATION TIME (h) | PERCENTAGE OF CORRECT ANSWERS (%) |
|---|---|---|---|---|---|
| 1 | mdg1 | p1, p2, p3 | 1, 2, 4 | 14 | 55 |
| 2 | mdg2 | p1, p2, p3 | 6, 4, 1 | 11 | 90 |
| 3 | mdg3 | p1, p2, p3 | 3, 2, 3 | 21 | 65 |
| 4 | mdg4 | p1, p2, p3 | 1, 2, 5 | 7 | 70 |

LEARNING PROGRAM, LEARNING APPARATUS, AND LEARNING METHOD

CROSS-REFERENCE TO RELATED APPLICATION

This application is based upon and claims the benefit of priority of the prior Japanese Patent Application No. 2017-193933, filed on Oct. 4, 2017, the entire contents of which are incorporated herein by reference.

FIELD

The present invention relates to a learning program, a learning apparatus, and a learning method.

BACKGROUND

In recent years, deep learning methods are utilized in the fields of voice recognition, image recognition, and the like. A deep learning method refers to a machine learning method that involves causing a neural network with a multi-layered structure (hereinafter, also simply referred to as a neural network) to learn learning data.

Specifically, a provider that provides users with a service (hereinafter, also simply referred to as a provider) generates a model using the deep learning method described above when, for example, building a business system for automatically responding to an inquiry from a user (hereinafter, also referred to as an information processing system). Accordingly, compared to when using a conventional machine learning method, for example, the provider can enhance a percentage of correct answers to users (for example, Japanese Laid-open Patent Publication No. 2015-162113, Japanese National Publication of International Patent Application No. 2008-507038, and Japanese National Publication of International Patent Application No. 2005-527034).

SUMMARY

According to an aspect of the embodiments includes a non-transitory computer-readable storage medium storing therein a learning program that causes a computer to execute a process includes: determining whether or not there is a discontinuity point at which a variation in a learning time relative to a variation in a learning parameter is discontinuous; specifying, when the discontinuity point is present, ranges of the learning parameter in which the variation in the learning time relative to the variation in the learning parameter is continuous, based on the discontinuity point; calculating, for each of the specified ranges, an estimated value of performance of trials using a trial parameter learned by machine learning per a learning time of machine learning using a learning parameter included in the range; specifying a learning parameter which enables any of the estimated values selected in accordance with a magnitude of the estimated value among the calculated estimated values; and executing machine learning using the specified learning parameter.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram for explaining a specific example of the performance information 131.

FIG. 21 is a diagram for explaining a specific example of the information on percentage of correct answers 131a.

FIG. 22 is a diagram for explaining a specific example of the performance information 131.

DESCRIPTION OF EMBODIMENTS

The model described above is generated based on, for example, values of various parameters corresponding to the deep learning method being used. Therefore, for example, parameters to be used are input when building an information processing system.

The percentage of correct answers made by the information processing system described above to users may be influenced by values of parameters input during the generation of a model. Therefore, the provider needs to determine, to the greatest extent feasible, values of parameters that can enhance the percentage of correct answers to users. In consideration thereof, the provider uses a function that enables an appropriate value of a parameter to be determined (hereinafter, also referred to as an acquisition function) to determine a value of a parameter needed for generating a model.

However, determining values of parameters needed for generating a model as described above may be premised on the acquisition function having continuity. Therefore, when the acquisition function is discontinuous, the provider is unable to specify an appropriate value of a parameter in an efficient manner. Hereinafter, an overall configuration of an information processing system will be described.

Configuration of Information Processing System

Figure 1:
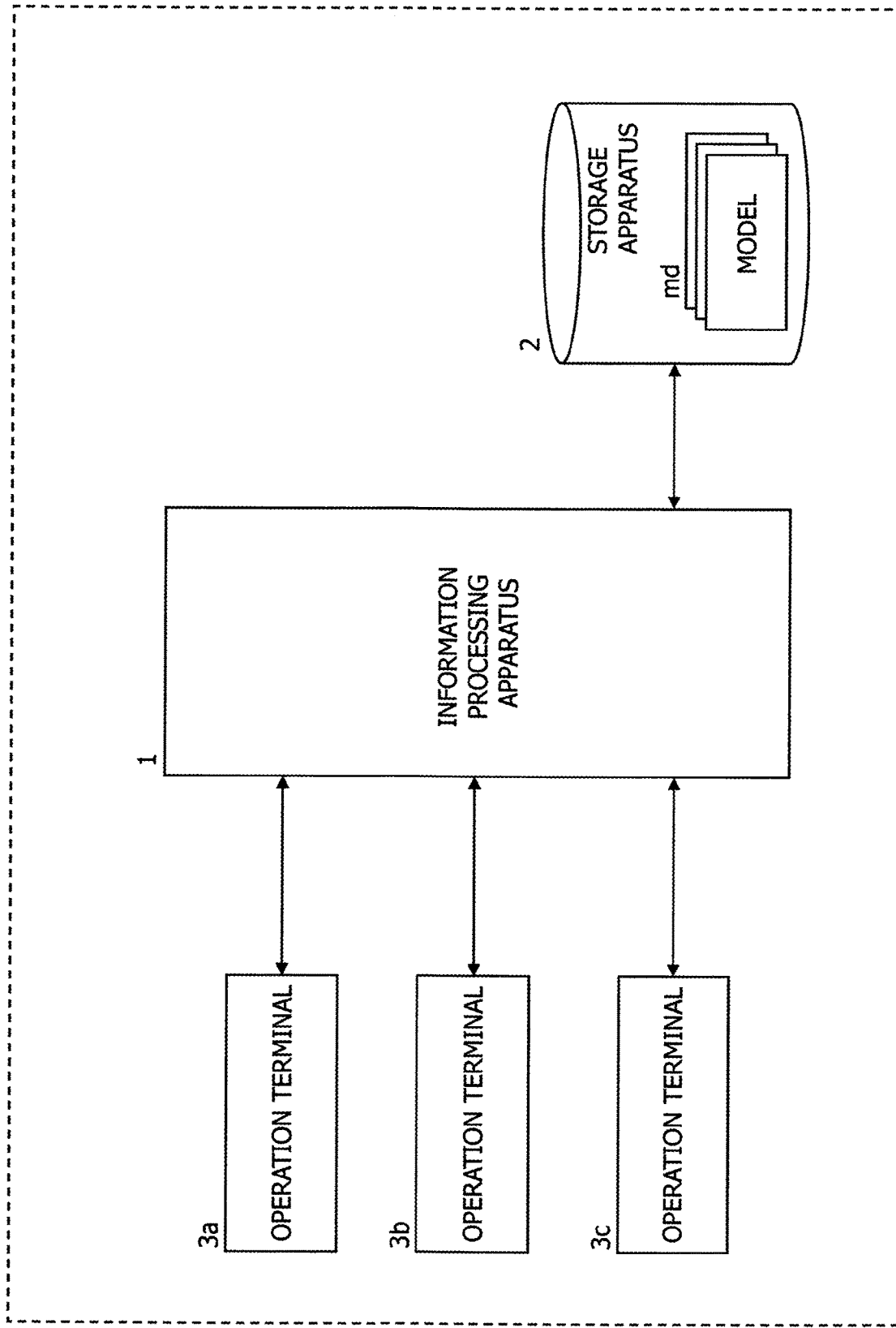
FIG. 1 is a diagram illustrating an overall configuration of an information processing system 10.

FIG. 1 is a diagram illustrating an overall configuration of an information processing system 10. The information processing system 10 illustrated in FIG. 1 includes an information processing apparatus 1, a storage apparatus 2, and operation terminals 3. The operation terminals 3 illustrated in FIG. 1 include operation terminals 3a, 3b, and 3c.

As illustrated in FIG. 1, for example, when a user issues an instruction via the operation terminal 3 to perform a process (hereinafter, also referred to as a learning process) of generating a model md (hereinafter, also referred to as a trial parameter) to be used in the information processing system 10, the information processing apparatus 1 specifies a value of a parameter that enables a percentage of correct answers to be enhanced and generates the model md using the specified value of the parameter as an input. Subsequently, as illustrated in FIG. 1, the information processing apparatus 1 stores the generated model md in the storage apparatus 2.

Specifically, the information processing apparatus 1 respectively inputs values of a plurality of parameters to generate models md. In addition, the information processing apparatus 1 determines a model md with a highest percentage of correct answers among the generated models md as the model md to be used in the information processing system 10. Hereinafter, a specific example when a value of a parameter is specified will be described.

Specific Example when Value of Parameter is Specified

FIGS. 2 to 5 are diagrams for explaining a specific example when a value of a parameter is specified. Specifically, FIGS. 2 to 5 are graphs illustrating a percentage of correct answers c/t per generation time of a model md (hereinafter, also referred as a percentage of correct answers per time c/t). Abscissas of the graphs illustrated in FIGS. 2 to 5 indicate a value of a parameter p (hereinafter, also simply expressed as p). In addition, ordinates of the graphs illustrated in FIGS. 2 to 5 indicate the percentage of correct answers per time c/t. In the following description, it is assumed that a parameter p1 is the only parameter p of which a value is input when generating a model. It is also assumed that any of integer values "1" to "6" is to be set to the parameter p1.

Figure 2:
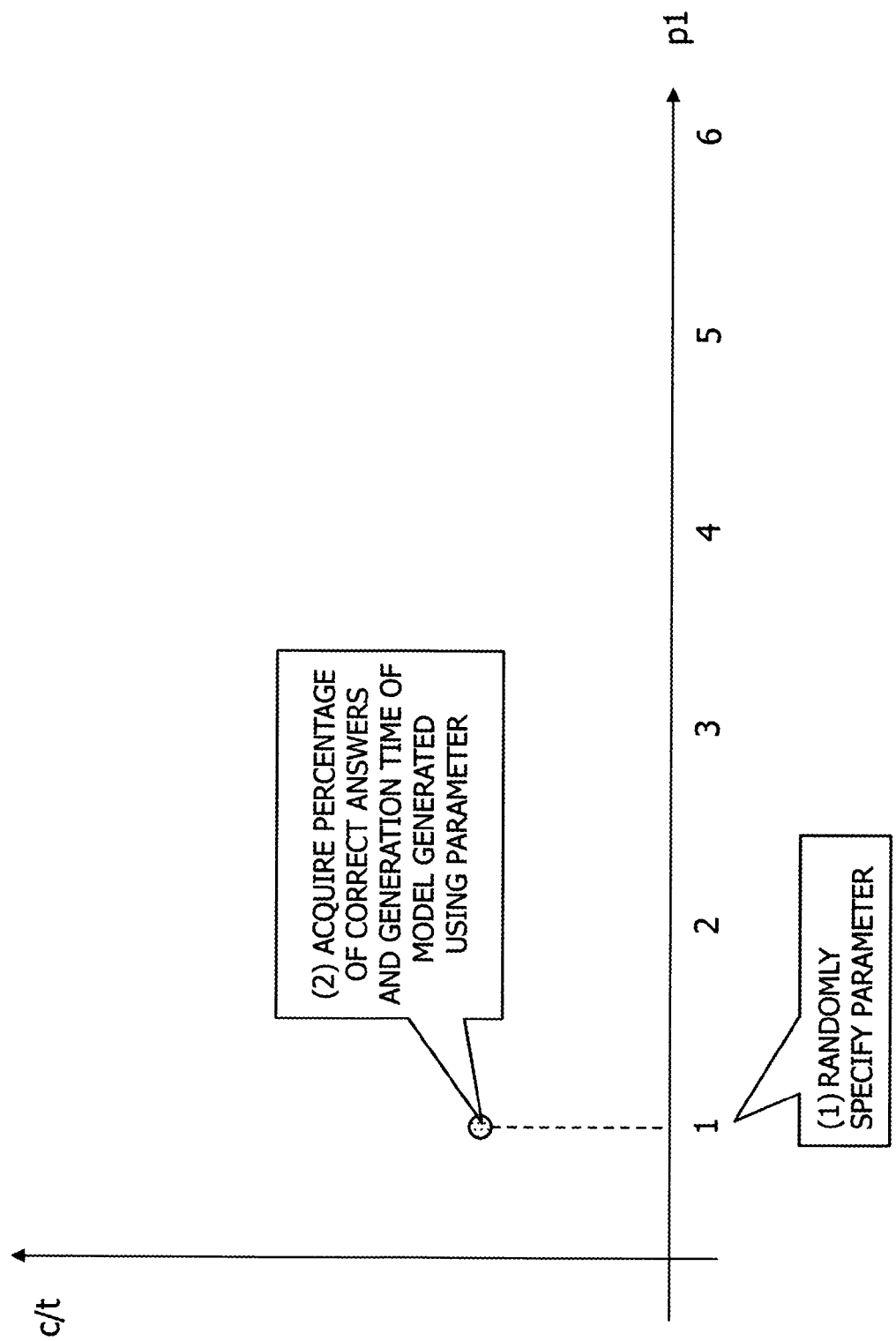
FIG. 2 is diagram for explaining a specific example when a value of a parameter is specified.

First, as illustrated in FIG. 2, the information processing apparatus 1 specifies, for example, "1" as the parameter p1 ((1) in FIG. 2). In addition, as illustrated in FIG. 2, the information processing apparatus 1 generates a model md1 by inputting "1" as the parameter p1, and acquires a percentage of correct answers c1 when using the generated model md1 and a generation time t1 of the generated model md1 ((2) in FIG. 2). Subsequently, as illustrated in FIG. 3, by inputting all acquired percentages of correct answers c (a percentage of correct answers c1), all acquired generation times t (the generation time t1), and values of the parameter p1 to an acquisition function based on a Gaussian process, the information processing apparatus 1 calculates an expected improvement per time ei/t (a degree of expectation for an improvement in the percentage of correct answers per time c/t) corresponding to each value of the parameter p1 ((3) in FIG. 3).

Figure 3:
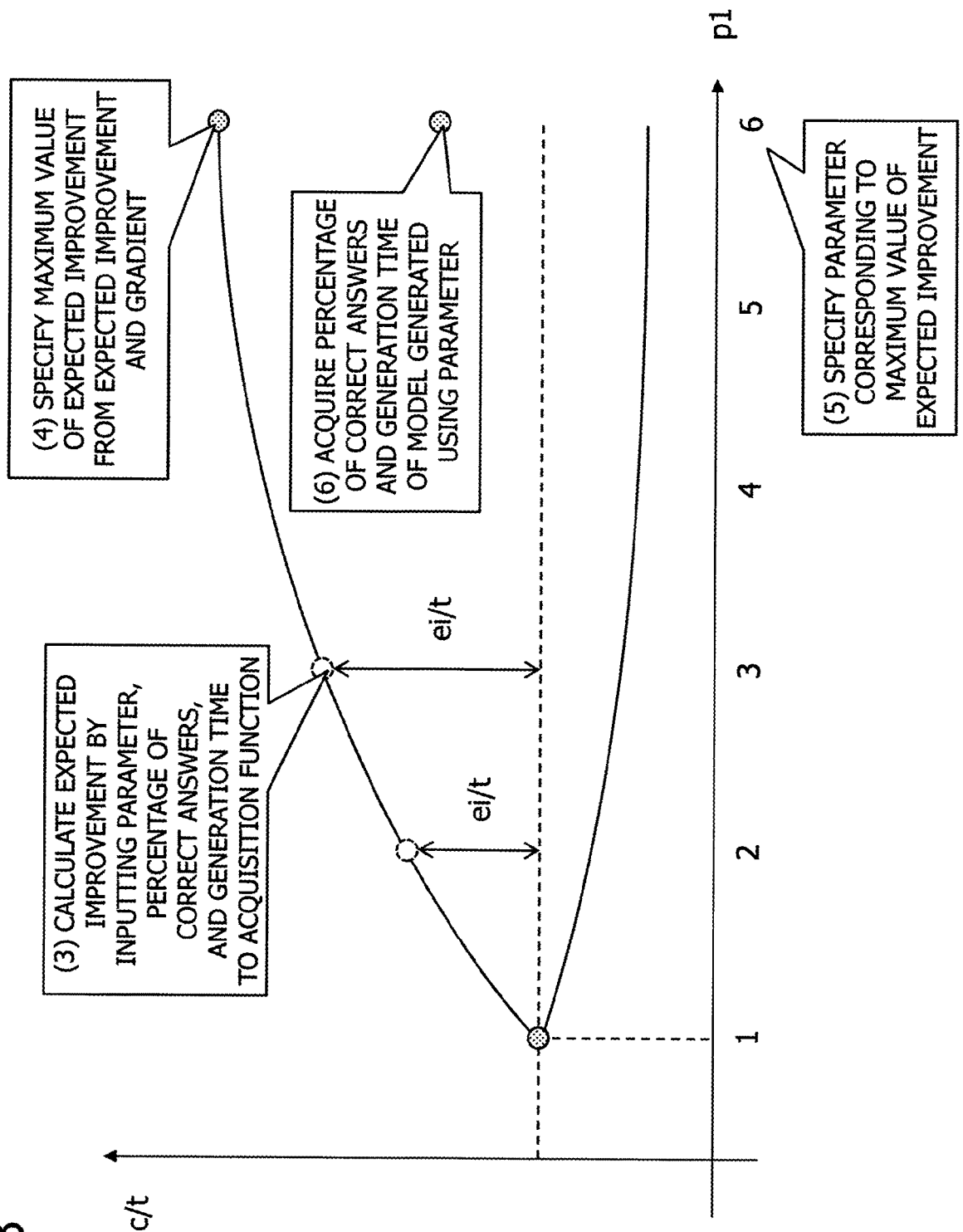
FIG. 3 is diagram for explaining a specific example when a value of a parameter is specified.

In addition, as illustrated in FIG. 3, the information processing apparatus 1 specifies a maximum value of the expected improvement per time ei/t using, for example, the calculated expected improvement per time ei/t and a gradient of the expected improvement per time ei/t (hereinafter, also simply referred to as a gradient) estimated from the calculated expected improvement per time ei/t, and specifies a value of the parameter p1 corresponding to the specified maximum value ((4) and (5) in FIG. 3). Specifically, as illustrated in FIG. 3, for example, the information processing apparatus 1 specifies "6" as the maximum value of the expected improvement per time ei/t using the expected improvement per time ei/t when the value of the parameter p1 is "2", the expected improvement per time ei/t when the value of the parameter p1 is "3", and gradients estimated from the expected improvements per time ei/t. In other words, in this case, the information processing apparatus 1 specifies "6" as the value of the parameter p1 to be input when generating a next model md2.

Furthermore, the information processing apparatus 1 generates the model md2 by inputting "6" as the parameter p1, and acquires a percentage of correct answers c2 when using the generated model md2 and a generation time t2 of the generated model md2 ((6) in FIG. 3). Subsequently, as illustrated in FIG. 4, by inputting all acquired percentages of correct answers c (the percentage of correct answers c1 and the percentage of correct answers c2), all acquired generation times t (the generation time t1 and the generation time t2), and values of the parameter p1 to an acquisition function based on a Gaussian process, the information processing apparatus 1 calculates an expected improvement per time ei/t corresponding to each value of the parameter p1 ((7) in FIG. 4).

Figure 4:
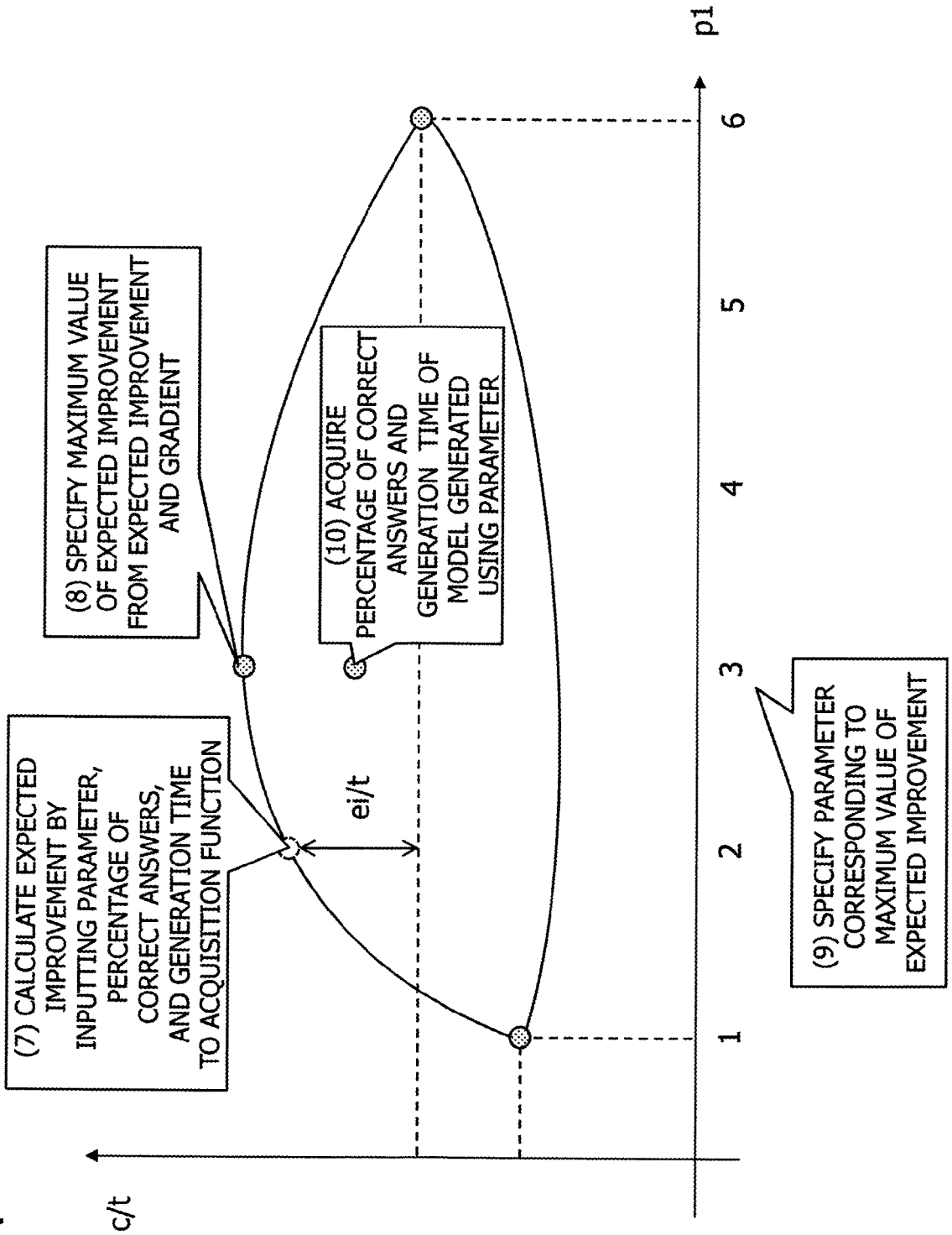
FIG. 4 is diagram for explaining a specific example when a value of a parameter is specified.

In addition, as illustrated in FIG. 4, the information processing apparatus 1 specifies a maximum value of the expected improvement per time ei/t using the calculated expected improvement per time ei/t and a gradient, and specifies a value of the parameter p1 corresponding to the specified maximum value ((8) and (9) in FIG. 4). Furthermore, as illustrated in FIG. 4, for example, the information processing apparatus 1 specifies "3" as the value of the parameter p1 to be input when generating a next model md3. In other words, in this case, the information processing apparatus 1 specifies "3" as the value of the parameter p1 to be input when generating the next model md3.

Furthermore, the information processing apparatus 1 generates the model md3 by inputting "3" as the parameter p1, and acquires a percentage of correct answers c3 when using the generated model md3 and a generation time t3 of the generated model md3 ((10) in FIG. 4). Subsequently, as illustrated in FIG. 5, by inputting all acquired percentages of correct answers c (the percentage of correct answers c1, the percentage of correct answers c2, and the percentage of correct answers c3), all acquired generation times t (the generation time t1, the generation time t2, and the generation time t3), and values of the parameter p1 to an acquisition function based on a Gaussian process, the information processing apparatus 1 calculates an expected improvement per time ei/t corresponding to each value of the parameter p1 ((11) in FIG. 5).

Figure 5:
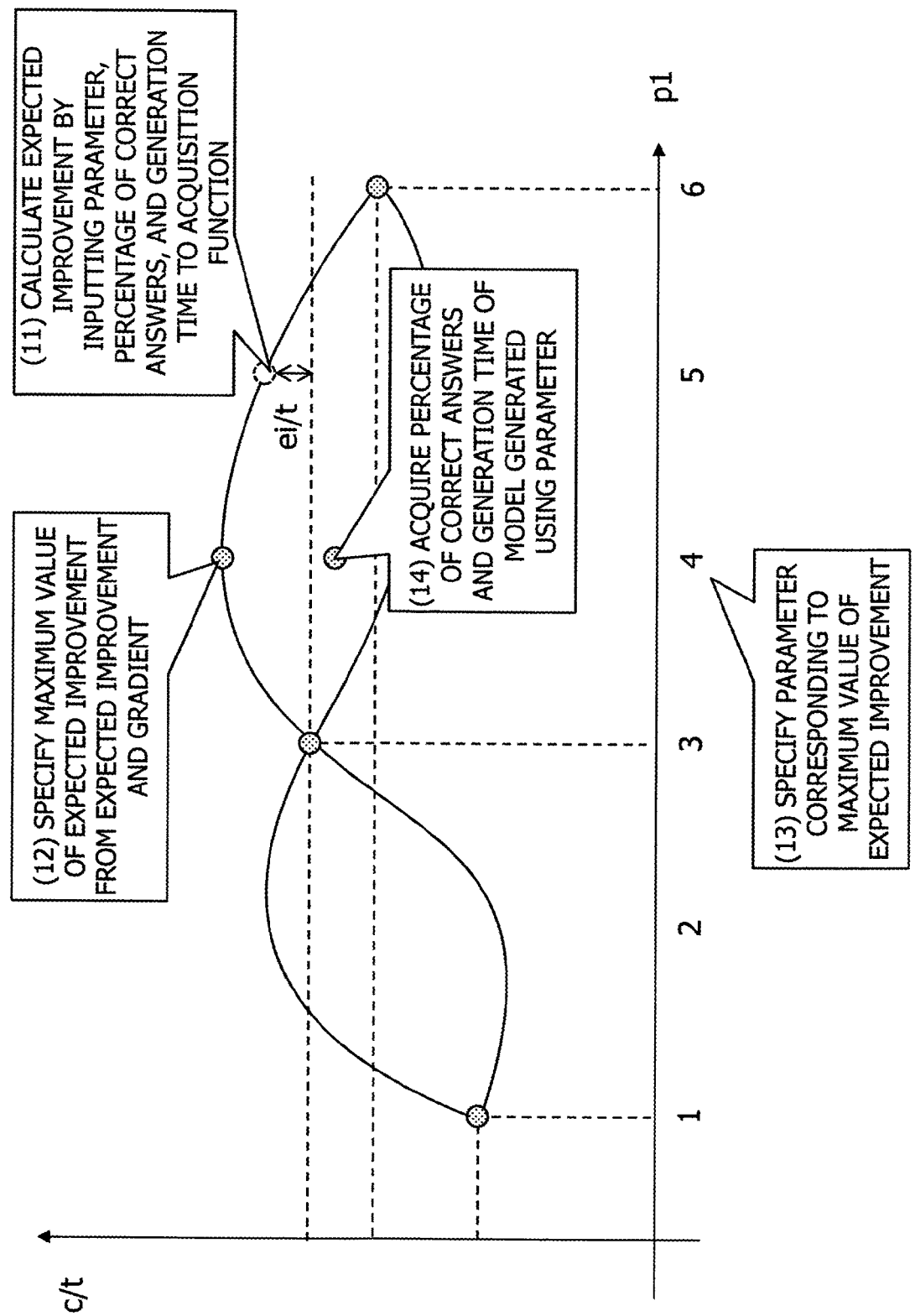
FIG. 5 is diagram for explaining a specific example when a value of a parameter is specified.

In addition, as illustrated in FIG. 5, the information processing apparatus 1 specifies a maximum value of the expected improvement per time ei/t using the calculated expected improvement per time ei/t and a gradient, and specifies a value of the parameter p1 corresponding to the specified maximum value ((12) and (13) in FIG. 5). Furthermore, as illustrated in FIG. 5, for example, the information processing apparatus 1 specifies "4" as the value of the parameter p1 to be input when generating a next model md4. In other words, in this case, the information processing apparatus 1 specifies "4" as the value of the parameter p1 to be input when generating the next model md4.

Accordingly, the information processing apparatus 1 can consecutively specify a value of a parameter with a high likelihood of enabling a model with a high percentage of correct answers per time c/t to be generated based on information (the percentage of correct answers c and the generation time t) acquired from a generated model md and the calculated expected improvement per time ei/t. Therefore, the information processing apparatus 1 can generate a model md with a high percentage of correct answers per time c/t in an efficient manner.

Subsequently, for example, the information processing apparatus 1 refers to performance information 131 including the percentage of correct answers c and the generation time t corresponding to each generated model md, and specifies a model md with the highest percentage of correct answers per time c/t. In addition, the information processing apparatus 1 determines the specified model md as the model md to be used in the information processing system 10. Hereinafter, a specific example of the performance information 131 will be described.

Specific Example of Performance Information (1) FIG. 6 is a diagram for explaining a specific example of the performance information 131.

The performance information 131 illustrated in FIG. 6 includes, as items, an "item number" for identifying each piece of information included in the performance information 131, a "model name" for identifying each model md, a "parameter name" for identifying the parameter p, and a "value" in which is set a value of the parameter p set in the "parameter name". In addition, the performance information 131 illustrated in FIG. 6 includes, as items, a "generation time" in which is set the generation time t of the model md generated by inputting the value set in the "value" as the parameter p set in the "parameter name", and a "percentage of correct answers" in which is set the percentage of correct answers c (for example, the percentage of correct answers per time c/t) when using the model md generated by inputting the value set in the "value" as the parameter p set in the "parameter name".

Specifically, in the performance information 131 illustrated in FIG. 6, in a piece of information of which the "item number" is "1", "p1" is set as the "parameter name", "1" is set as the "value", "1.5 (h)" is set as the "generation time", and "60(%)" is set as the "percentage of correct answers". A description of other pieces of information included in FIG. 6 will be omitted.

In addition, for example, the information processing apparatus 1 refers to the performance information 131 described with reference to FIG. 6 and determines that, among the pieces of information set in the "percentage of correct answers", "85%" which is a piece of information set in the "percentage of correct answers" of a piece of information of which the "model name" is "md4" (a piece of information of which the "item number" is "4") represents the highest percentage of correct answers. Therefore, in this case, the information processing apparatus 1 determines to build the information processing system 10 using, for example, the model md4.

A provider may build the information processing system 10 using a plurality of models md (hereinafter, also referred to as a model group mdg). Hereinafter, a specific example of a case where there are a plurality of models md used to build the information processing system 10 will be described.

Specific Example of Information Processing System Using Model Group

Figure 7:
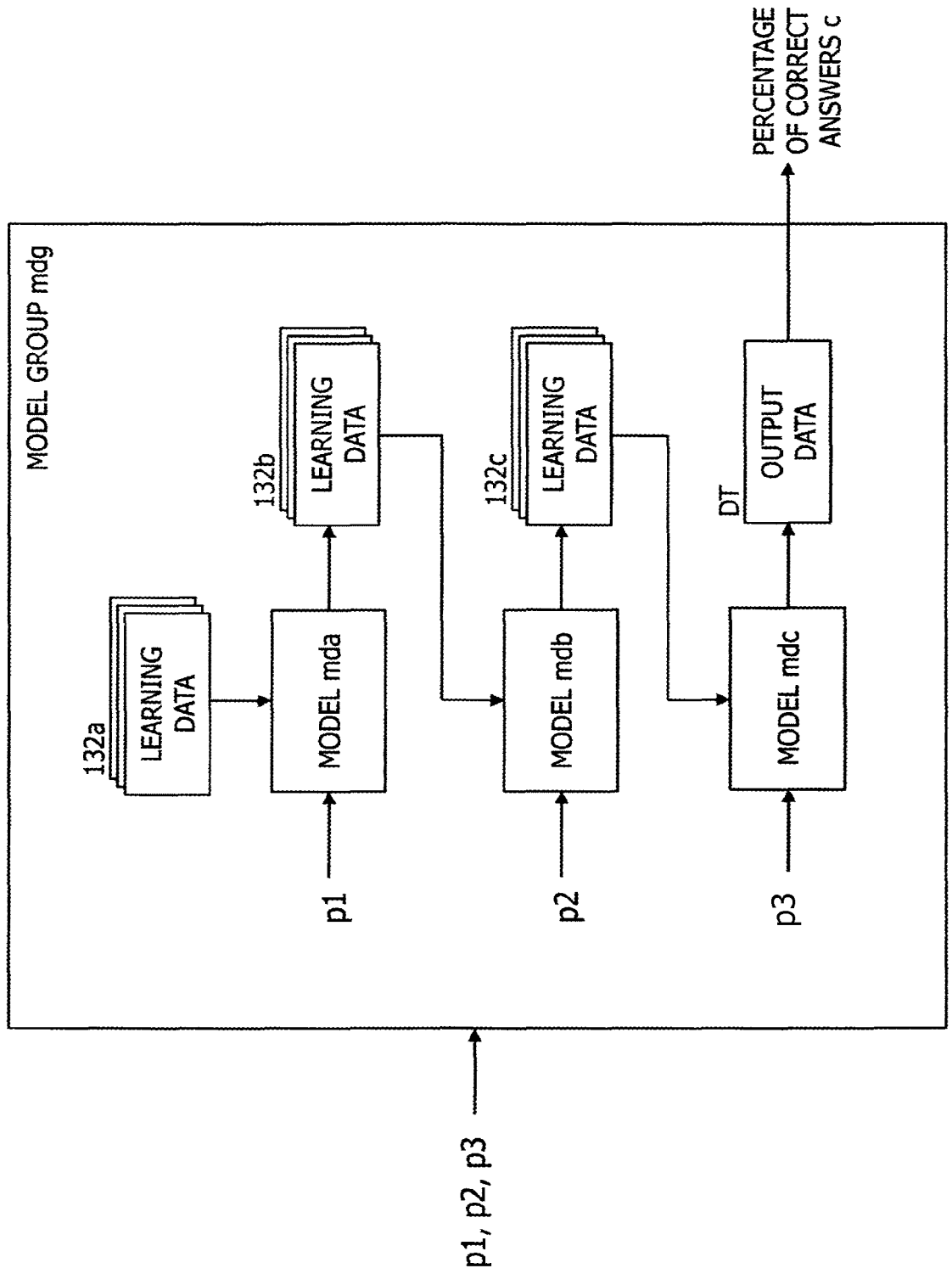
FIG. 7 is diagram for explaining a specific example of the information processing system 10 using a model group mdg.
Figure 8:
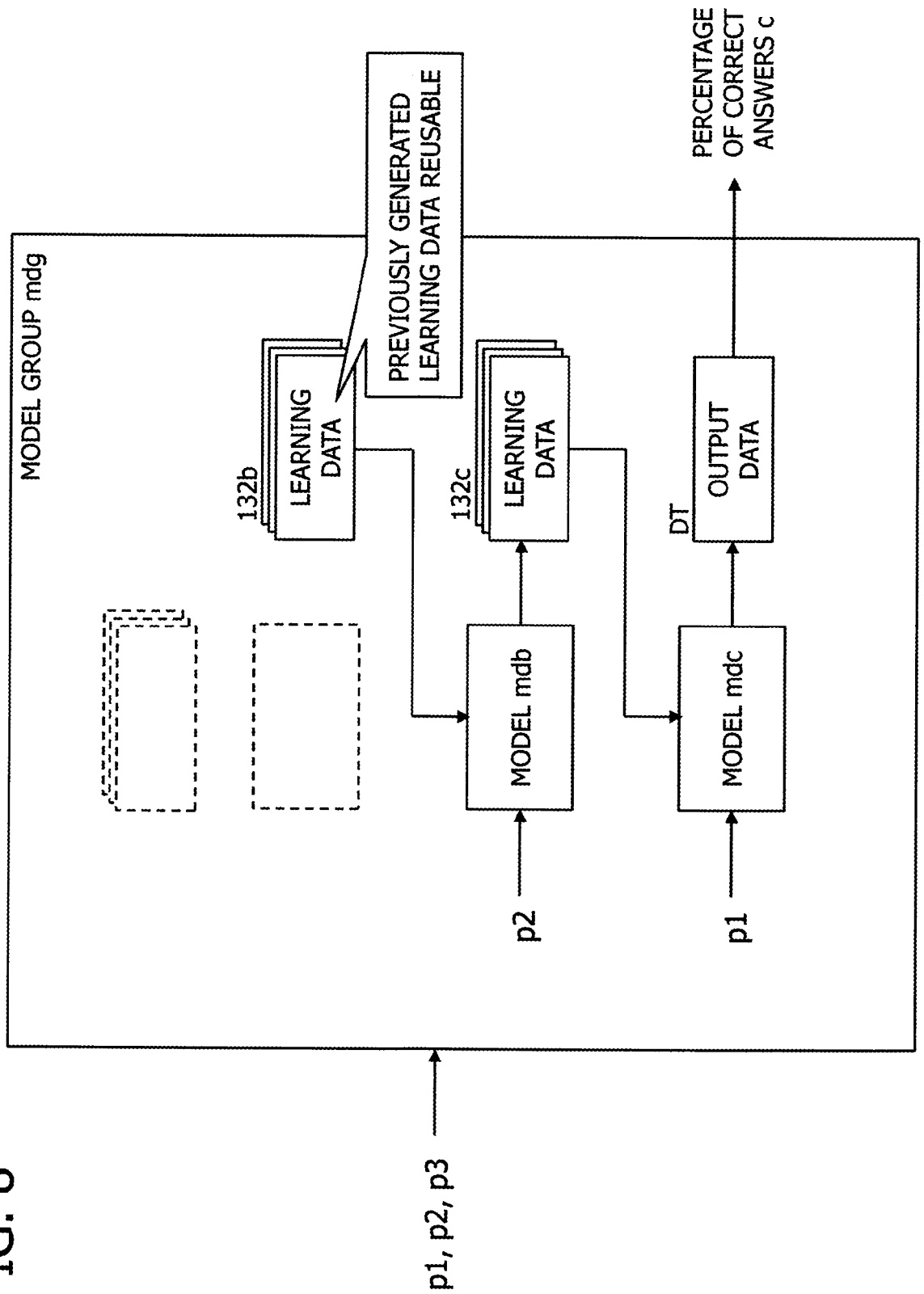
FIG. 8 is diagram for explaining a specific example of the information processing system 10 using a model group mdg.
Figure 9:
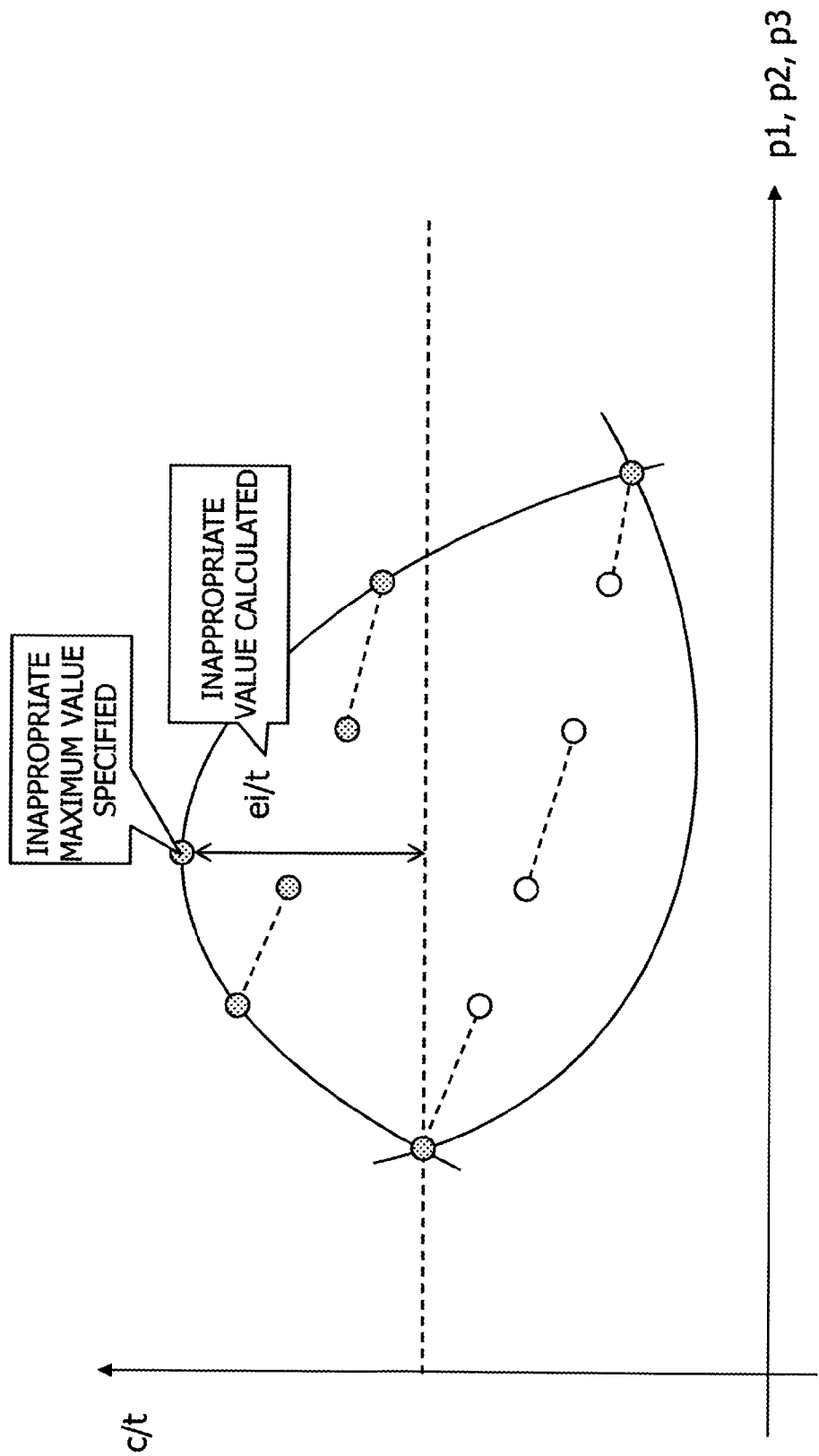
FIG. 9 is diagram for explaining a specific example of the information processing system 10 using a model group mdg.

FIGS. 7 to 9 are diagrams for explaining a specific example of the information processing system 10 using a model group mdg. The model group mdg illustrated in FIGS. 7 and 8 include a model mda, a model mdb, and a model mdc. In addition, FIG. 9 is a graph of the percentage of correct answers per time c/t in a case where a combination of values of parameters p1, p2, and p3 is represented by an abscissa for the sake of convenience.

As illustrated in FIG. 7, the information processing apparatus 1 generates the model mda by learning learning data 132 (hereinafter, also referred to as learning data 132a) prepared in advance and using the value of the parameter p1 as input. In addition, the information processing apparatus 1 acquires learning data 132b output by the model mda in accordance with input of a first data set (not illustrated).

Next, as illustrated in FIG. 7, the information processing apparatus 1 generates the model mdb by learning learning data 132 (hereinafter, also referred to as learning data 132b) and using the value of the parameter p2 as input. In addition, the information processing apparatus 1 acquires learning data 132c output by the model mdb in accordance with input of a second data set (not illustrated).

Furthermore, as illustrated in FIG. 7, the information processing apparatus 1 generates the model mdc by learning learning data 132 (hereinafter, also referred to as learning data 132c) and using the value of the parameter p3 as input. In addition, the information processing apparatus 1 acquires output data DT output by the model mdc in accordance with input of a third data set (not illustrated).

Subsequently, the information processing apparatus 1 acquires a proportion of data matching data expected as contents of the output data DT (hereinafter, also referred to as expected data) to the acquired output data DT as the percentage of correct answers c of the model group mdg. In addition, in a similar manner to that described with reference to FIGS. 2 to 5, the information processing apparatus 1 calculates the expected improvement per time ei/t and the like to specify values of the parameters p1, p2, and p3 to be used next.

Specifically, in the example illustrated in FIG. 7, when the values of the parameters p1, p2, and p3 are respectively "2", "4", and "5", the information processing apparatus 1 generates the model mda by inputting "2" as the value of the parameter p1, generates the model mdb by inputting "4" as the value of the parameter p2, and generates the model mdc by inputting "5" as the value of the parameter p3.

In addition, for example, when values next specified as the values of the parameters p1, p2, and p3 are respectively "2", "7", and "1", the value of the parameter p1 is the same as the previous value of the parameter p1. Therefore, in this case, the information processing apparatus 1 can reuse the learning data 132b previously generated by the model mda as illustrated in FIG. 8.

In addition, for example, when values next specified as the values of the parameters p1, p2, and p3 are respectively "2", "4", and "9", the values of the parameters p1 and p2 are the same as the previous values of the parameters p1 and p2. Therefore, in this case, the information processing apparatus 1 can reuse the learning data 132c previously generated by the model mdb.

Accordingly, the information processing apparatus 1 can omit the generation of the model mda or the model mdb and can reduce the generation time t of the model group mdg (the model mda, the model mdb, and the model mdc).

In the case described above, since there are both cases where the learning data 132 is reused and cases where the learning data 132 is not reused, the generation time t of the model group mdg is discontinuous. Therefore, as illustrated in FIG. 9, the provider may be unable to appropriately calculate the expected improvement per time ei/t as a result of using an acquisition function and may be unable to appropriately specify a value of the parameter p needed for generating the model group mdg.

In consideration thereof, the information processing apparatus 1 according to the present embodiment determines whether or not there is a discontinuity point at which a variation in the generation time t (hereinafter, also referred to as a learning time using the parameter p) of the model group mdg relative to a variation in the value of the parameter p (hereinafter, also referred to as a learning parameter) is discontinuous. As a result, when the information processing apparatus 1 determines that there is a discontinuity point, based on the discontinuity point, the information processing apparatus 1 specifies, a range of the value of the parameter p in which the variation in the generation time t of the model group mdg relative to the variation in the value of the parameter p is continuous.

Subsequently, for each specified range of the value of the parameter p, the information processing apparatus 1 calculates an expected improvement ei/t (hereinafter, also referred to as an estimated value of performance) per generation time t of the model group mdg using a value of the parameter p included in the range when using the model group mdg in the information processing system 10. In addition, the information processing apparatus 1 specifies a value of the parameter p which causes any expected improvement per time ei/t in accordance with a magnitude of the expected improvement per time ei/t to be obtained among the calculated expected improvements per time ei/t. Subsequently, the information processing apparatus 1 generates the model group mdg using the specified value of the parameter p.

In other words, when the information processing apparatus 1 determines that there is a discontinuity point in the generation time t of the model group mdg relative to a variation in the value of the parameter p, the information processing apparatus 1 divides the range of possible values of the parameter p into respective ranges of the value of the parameter p in which the variation in the generation time t of the model group mdg is continuous. In addition, for example, for each divided range of the value of the parameter p, the information processing apparatus 1 calculates the expected improvement per time ei/t using an acquisition function and determines the value of the parameter p corresponding to a maximum value among the calculated expected improvements per time ei/t as the value of the parameter p input to the model group mdg to be generated next.

Accordingly, even when there is a discontinuity point in the generation time t of the model group mdg relative to a variation in the value of the parameter p, the information processing apparatus 1 can calculate the expected improvement per time ei/t as a result of using an acquisition function in an appropriate manner. Therefore, the information processing apparatus 1 enables an appropriate value of the parameter p used to generate the next model group mdg to be specified in an efficient manner.

Hardware Configuration of Information Processing Apparatus

Figure 10:
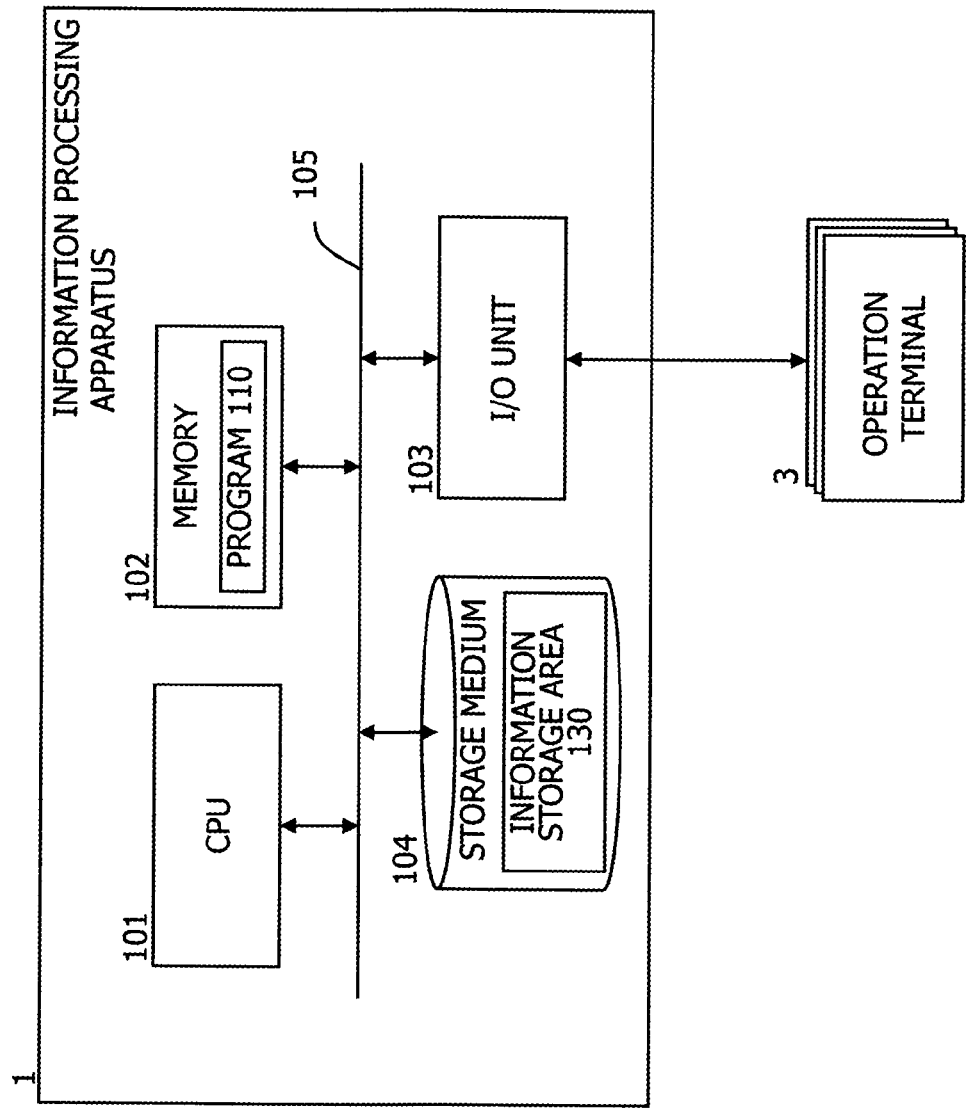
FIG. 10 is a diagram for explaining a hardware configuration of the information processing apparatus 1.

Next, a hardware configuration of the information processing apparatus 1 will be described. FIG. 10 is a diagram for explaining a hardware configuration of the information processing apparatus 1.

As illustrated in FIG. 10, the information processing apparatus 1 includes a CPU 101 that is a processor, a main memory 102 (hereinafter, also simply referred to as a memory 102), an external interface (I/O unit) 103, and a storage medium (a storage) 104. The respective units are connected to each other via a bus 105.

The storage medium 104 stores a program 110 for performing a learning process in a program storage area (not illustrated) in the storage medium 104.

As illustrated in FIG. 10, the CPU 101 performs the learning process in cooperation with a program 110 loaded from the storage medium 104 to the memory 102.

The storage medium 104 is, for example, a hard disk drive (HDD) or a solid state drive (SSD) and includes an information storage area 130 (hereinafter, also referred to as a storage unit 130) that stores information to be used when performing the learning process.

In addition, the external interface 103 communicates with the operation terminal 3 via a network.

Software Configuration of Information Processing Apparatus

Figure 11:
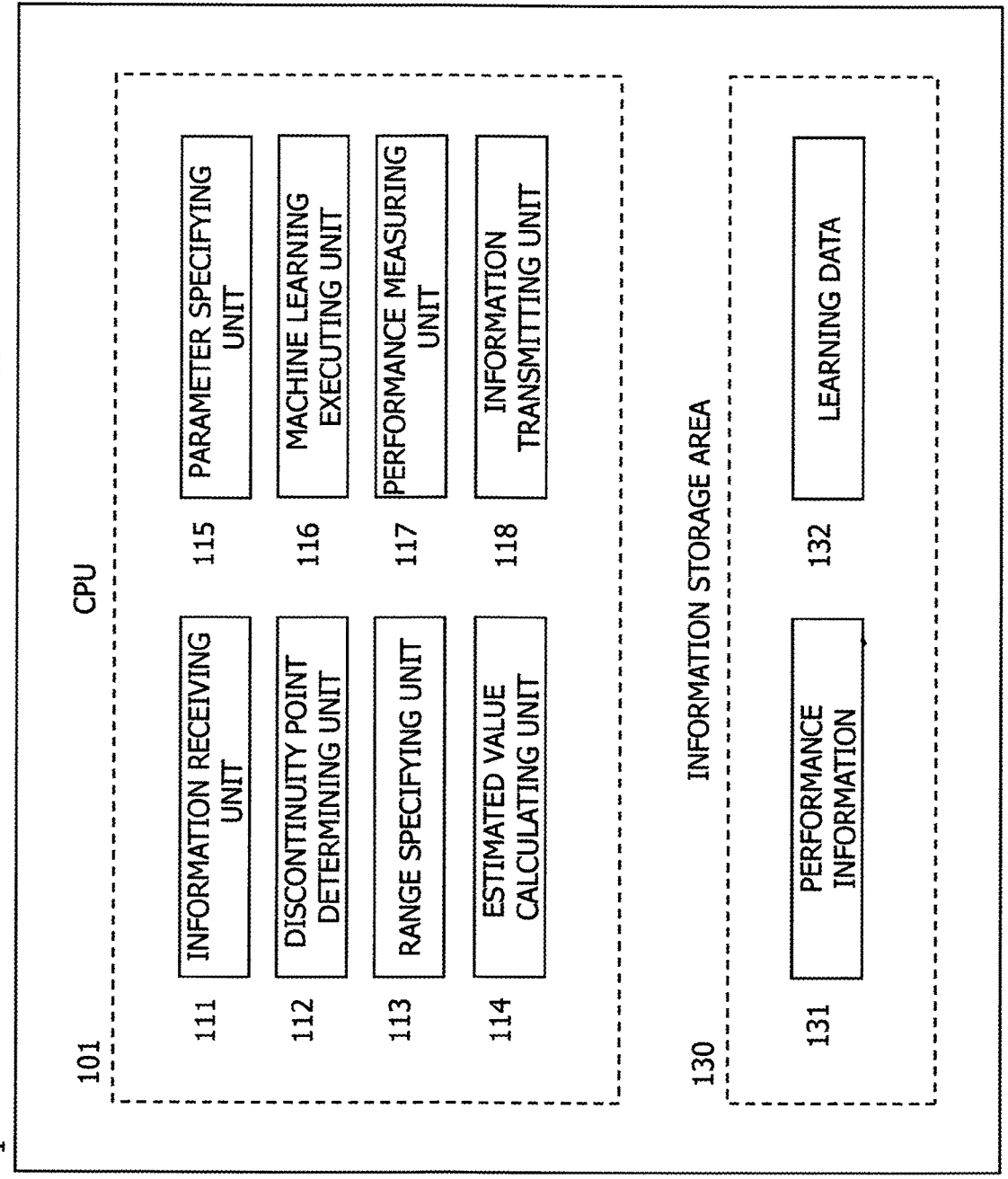
FIG. 11 is a block diagram of functions of the information processing apparatus 1 and a block diagram of information stored in the information storage area 130.

Next, a software configuration of the information processing apparatus 1 will be described. FIG. 11 is a block diagram of functions of the information processing apparatus 1 and a block diagram of information stored in the information storage area 130.

As illustrated in FIG. 11, in cooperation with the program 110, the CPU 101 operates as an information receiving unit 111, a discontinuity point determining unit 112, a range specifying unit 113, an estimated value calculating unit 114, a parameter specifying unit 115, a machine learning executing unit 116, a performance measuring unit 117, and an information transmitting unit 118. In addition, as illustrated in FIG. 11, performance information 131 and learning data 132 are stored in the information storage area 130. In the following description, it is assumed that the model group mdg described with reference to FIG. 7 is to be generated by the information processing apparatus 1.

The information receiving unit 111 receives a plurality of pieces of performance information 131 respectively including a value of the parameter p and a generation time of the model group mdg as a result of inputting the value of the parameter p. Specifically, in accordance with the performance measuring unit 117 (to be described later) acquiring a percentage of correct answers c in a case where the model group mdg having already been generated is used and the generation time t of the model group mdg, the information receiving unit 111 receives performance information 131 including these pieces of information.

The discontinuity point determining unit 112 determines whether or not there is a discontinuity point at which a variation in the generation time t of the model group mdg relative to a variation in the value of the parameter p is discontinuous in a range of possible values of the parameter p. Specifically, the discontinuity point determining unit 112 determines whether or not there is a discontinuity point by, for example, referring to the value of the parameter p and the generation time t included in each of the plurality of pieces of performance information 131 received by the information receiving unit 111. In addition, the discontinuity point determining unit 112 determines whether or not there is a discontinuity point by determining whether or not a plurality of models md included in the model group mdg generated by the information processing apparatus 1 include a model md using a learning result by another model md.

When the discontinuity point determining unit 112 determines that there is a discontinuity point, based on the discontinuity point, the range specifying unit 113 specifies a range of the value of the parameter p in which the variation in the generation time t relative to the variation in the value of the parameter p is continuous. Specifically, the range specifying unit 113 specifies a range of the value of the parameter p in which the variation in the generation time t relative to the variation in the value of the parameter p is continuous by, for example, dividing a range of possible values of the parameter p at each value of the parameter p corresponding to the discontinuity point determined to be present by the discontinuity point determining unit 112.

The estimated value calculating unit 114 calculates an expected improvement per time ei/t when using the model group mdg in the information processing system 10 for each range of the value of the parameter p specified by the range specifying unit 113. Specifically, for example, the estimated value calculating unit 114 calculates a maximum value of the expected improvement per time ei/t when using the model group mdg in the information processing system 10 for each range of the value of the parameter p specified by the range specifying unit 113.

The parameter specifying unit 115 specifies a value of the parameter p which causes any expected improvement per time ei/t in accordance with a magnitude of the expected improvement per time ei/t to be obtained among the expected improvements per time ei/t calculated by the estimated value calculating unit 114. Specifically, for example, the parameter specifying unit 115 specifies a value of the parameter p which causes an expected improvement per time ei/t satisfying prescribed conditions to be obtained among the expected improvements per time ei/t calculated by the estimated value calculating unit 114.

Moreover, the expected improvement per time ei/t satisfying prescribed conditions may be, for example, a maximum value among the expected improvements per time ei/t calculated by the estimated value calculating unit 114. Alternatively, the expected improvement per time ei/t satisfying prescribed conditions may be, for example, a maximum value of the expected improvements per time ei/t specified from the expected improvement per time ei/t calculated by the estimated value calculating unit 114 and a gradient of the expected improvement per time ei/t.

The machine learning executing unit 116 generates the model group mdg using the value of the parameter p specified by the parameter specifying unit 115.

The performance measuring unit 117 acquires (measures) a percentage of correct answers c in a case where the model group mdg having already been generated is used and the generation time t of the model group mdg.

The information transmitting unit 118 transmits, for example, information indicating the model group mdg with the highest percentage of correct answers c among the model groups mdg generated by the machine learning executing unit 116 to the operation terminal 3.

Outline of First Embodiment

Figure 12:
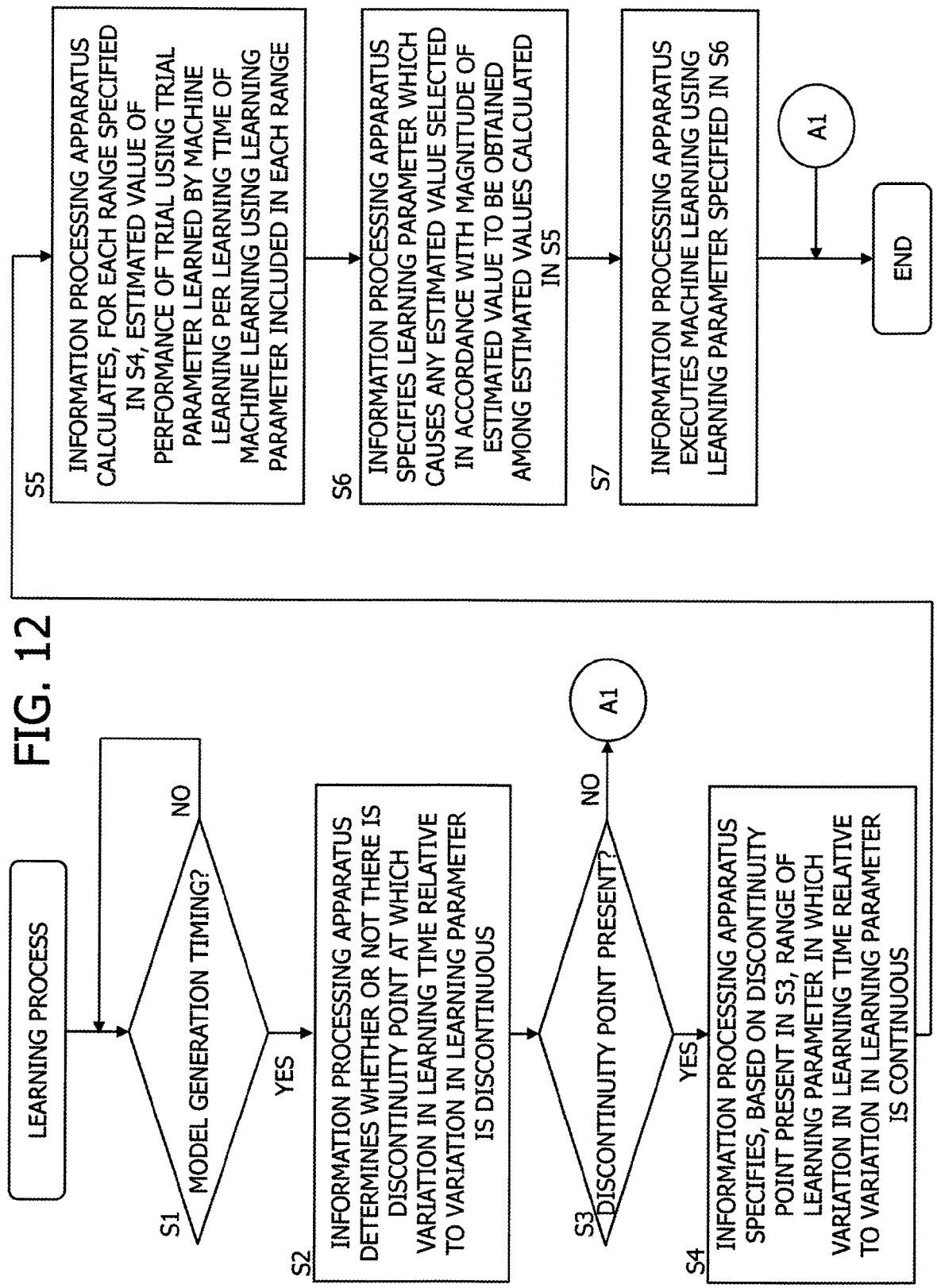
FIG. 12 is a flow chart for explaining an outline of a learning process according to the first embodiment.
Figure 13:
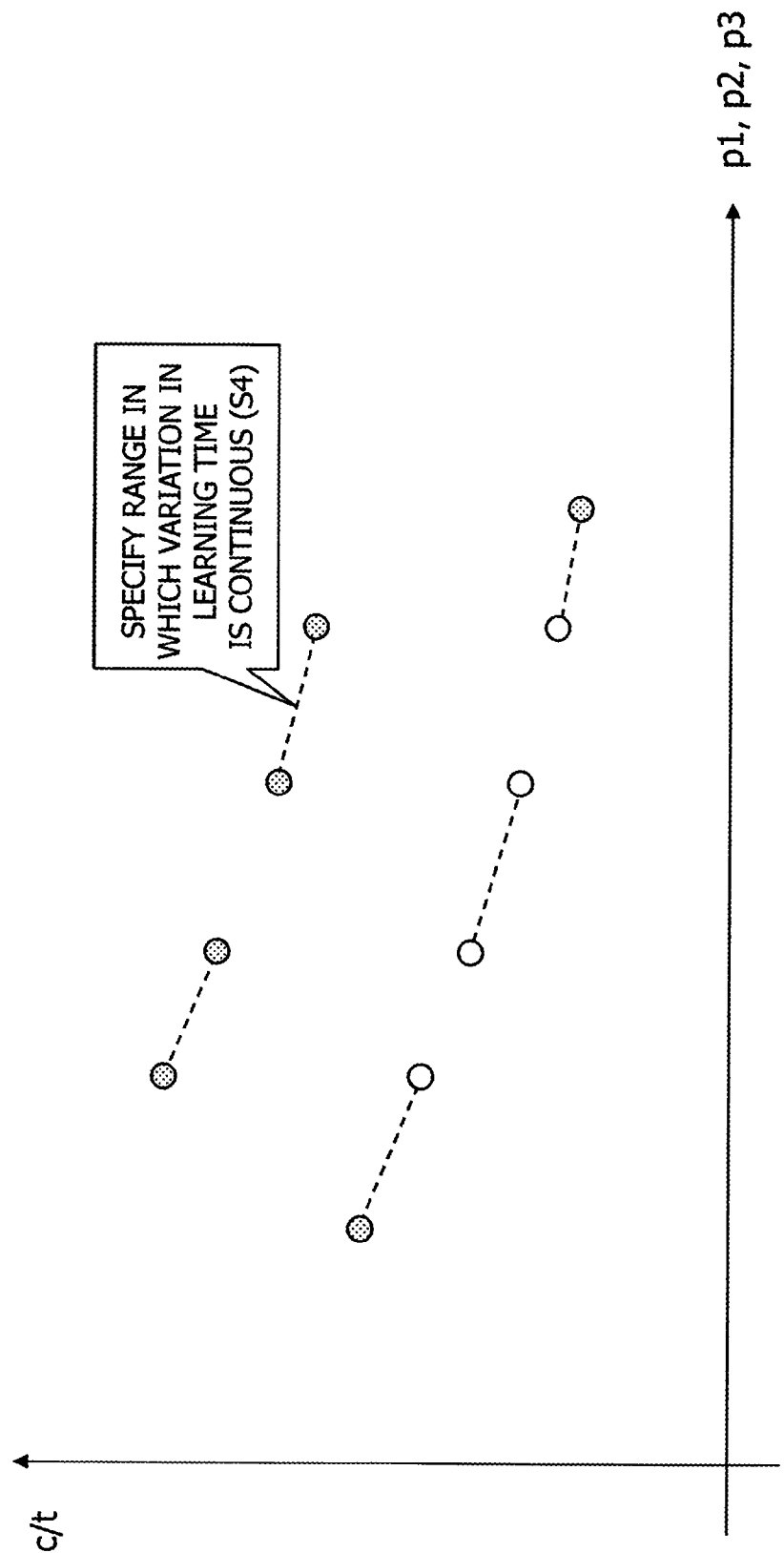
FIG. 13 is diagram for explaining an outline of the learning process according to the first embodiment.
Figure 14:
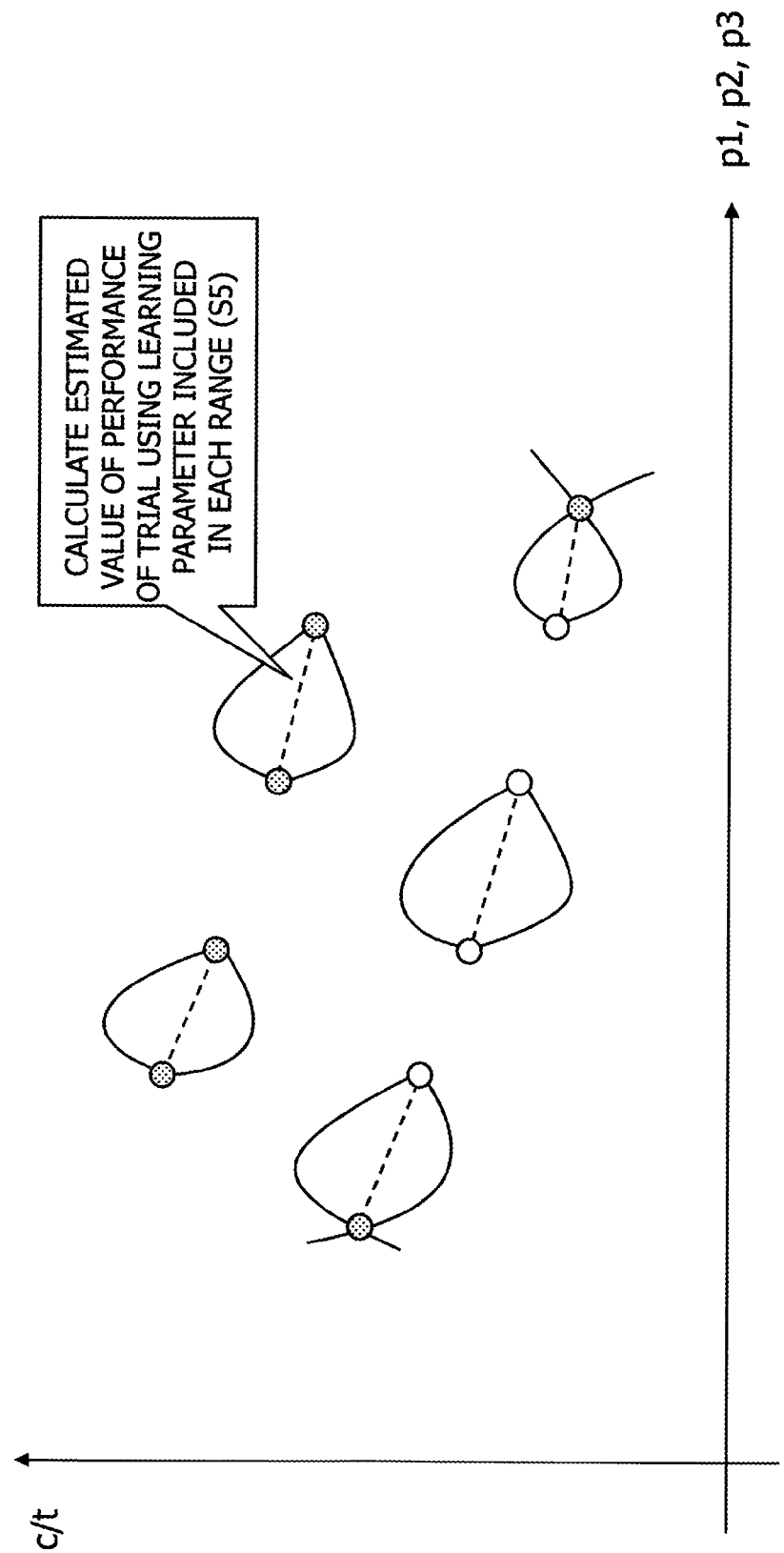
FIG. 14 is diagram for explaining an outline of the learning process according to the first embodiment.
Figure 15:
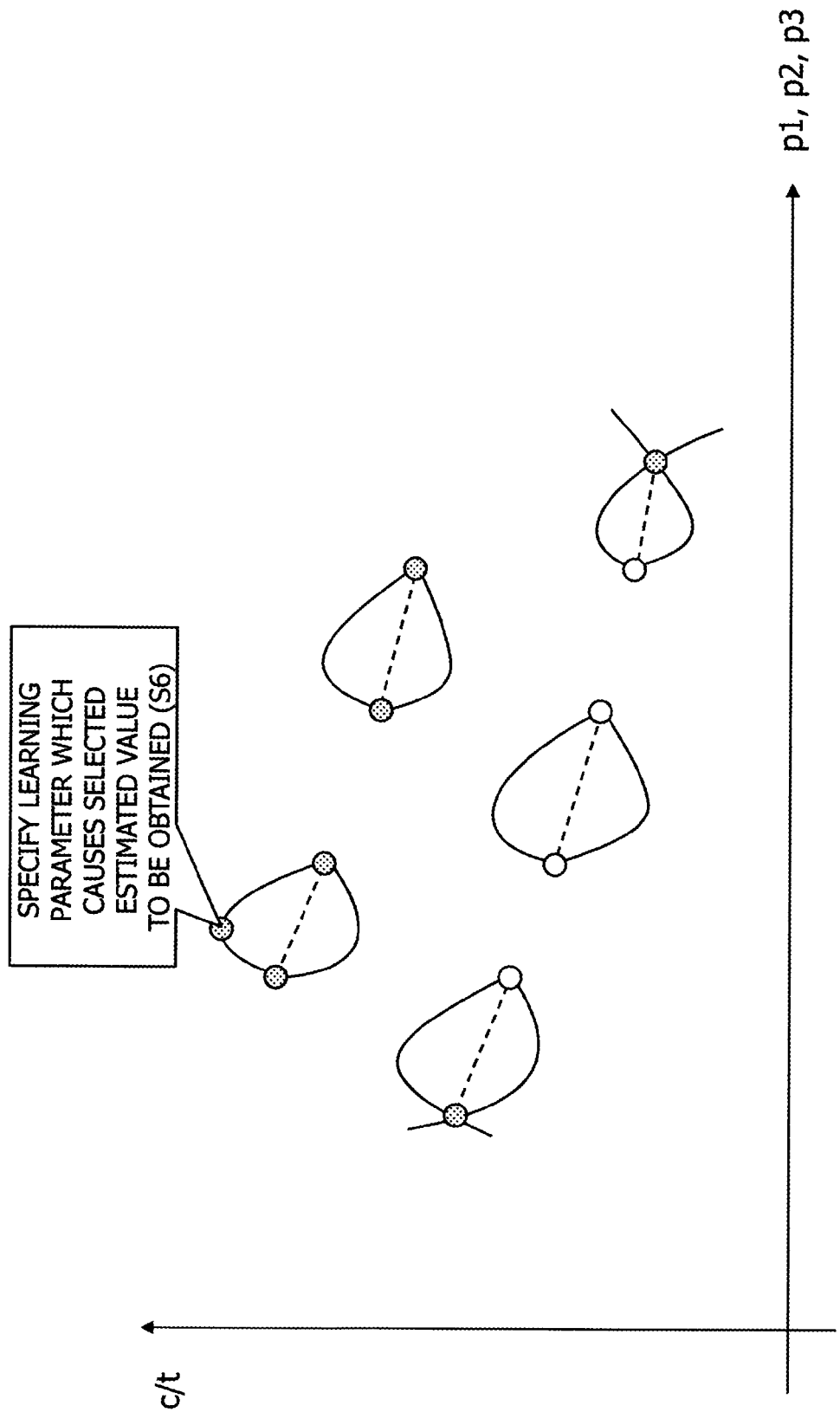
FIG. 15 is diagram for explaining an outline of the learning process according to the first embodiment.

Next, an outline of a first embodiment will be described. FIG. 12 is a flow chart for explaining an outline of a learning process according to the first embodiment. In addition, FIGS. 13 to 15 are diagrams for explaining an outline of the learning process according to the first embodiment. An outline of the learning process according to the first embodiment illustrated in FIG. 12 will now be described with reference to FIGS. 13 to 15. In a similar manner to FIG. 9, graphs illustrated in FIGS. 13 to 15 are graphs of the percentage of correct answers per time c/t in a case where a combination of values of parameters p1, p2, and p3 is represented by an abscissa for the sake of convenience.

As illustrated in FIG. 12, the information processing apparatus 1 stands by until a model generation timing arrives (NO in S1). Specifically, the information processing apparatus 1 stands by until, for example, the provider performs an input via the operation terminal 3 to the effect that generation of the model group mdg used in the information processing system 10 is to be started.

In addition, when the model generation timing arrives (YES in S1), the information processing apparatus 1 determines whether or not there is a discontinuity point at which a variation in the generation time t of the model group mdg relative to a variation in the value of the parameter p is discontinuous (S2).

As a result, when the information processing apparatus 1 determines that there is a discontinuity point (YES in S3), as illustrated in FIG. 13, based on the discontinuity point found present in the process of S3, the information processing apparatus 1 specifies a range of the value of the parameter p in which the variation in the generation time t of the model group mdg relative to the variation in the value of the parameter p is continuous (S4).

Subsequently, as illustrated in FIG. 14, the information processing apparatus 1 calculates an expected improvement per time ei/t when using the model group mdg in the information processing system 10 for each range specified in the process of S4 (S5). Specifically, the estimated value calculating unit 114 calculates a maximum value of the expected improvement per time ei/t when using the model group mdg in the information processing system 10 for each range of the value of the parameter p specified by the range specifying unit 113.

In addition, as illustrated in FIG. 15, the information processing apparatus 1 specifies a value of the parameter p which causes any expected improvement per time ei/t selected in accordance with a magnitude of the expected improvement per time ei/t to be obtained among the expected improvements per time ei/t calculated in the process of S5 (S6).

Subsequently, the information processing apparatus 1 generates the model group mdg using the value of the parameter p specified in the process of S6 (S7).

On the other hand, when the information processing apparatus 1 determines that there is no discontinuity point in the process of S3 (NO in S3), the information processing apparatus 1 does not perform the processes of S4 to S7. Specifically, in this case, the information processing apparatus 1 generates the model group mdg using the value of the parameter p included in the performance information 131 received in the process of S1.

In other words, when the information processing apparatus 1 determines that there is a discontinuity point in the generation time t of the model group mdg relative to a variation in the value of the parameter p, the information processing apparatus 1 divides the range of possible values of the parameter p into respective ranges of the value of the parameter p in which the variation in the generation time t of the model group mdg is continuous. In addition, for example, for each divided range of the value of the parameter p, the information processing apparatus 1 calculates the expected improvement per time ei/t and determines the value of the parameter p corresponding to a maximum value among the calculated expected improvements per time ei/t as the value of the parameter p input to the model group mdg to be generated next.

Accordingly, the information processing apparatus 1 enables an appropriate value of the parameter p used to generate the next model group mdg to be specified in an efficient manner even when there is a discontinuity point of the generation time t of the model group mdg relative to a variation in the value of the parameter p.

Moreover, for example, the model group mdg may be a model group for performing a search process (trial) using a search parameter. In addition, the expected improvement per time ei/t in a case where the model group mdg is used in the information processing system 10 may be, for example, a degree of expectation for an improvement in the percentage of correct answers c per time (an evaluation of a search result) in a case where a search process using the model group mdg is performed.

Details of First Embodiment

Figure 23:
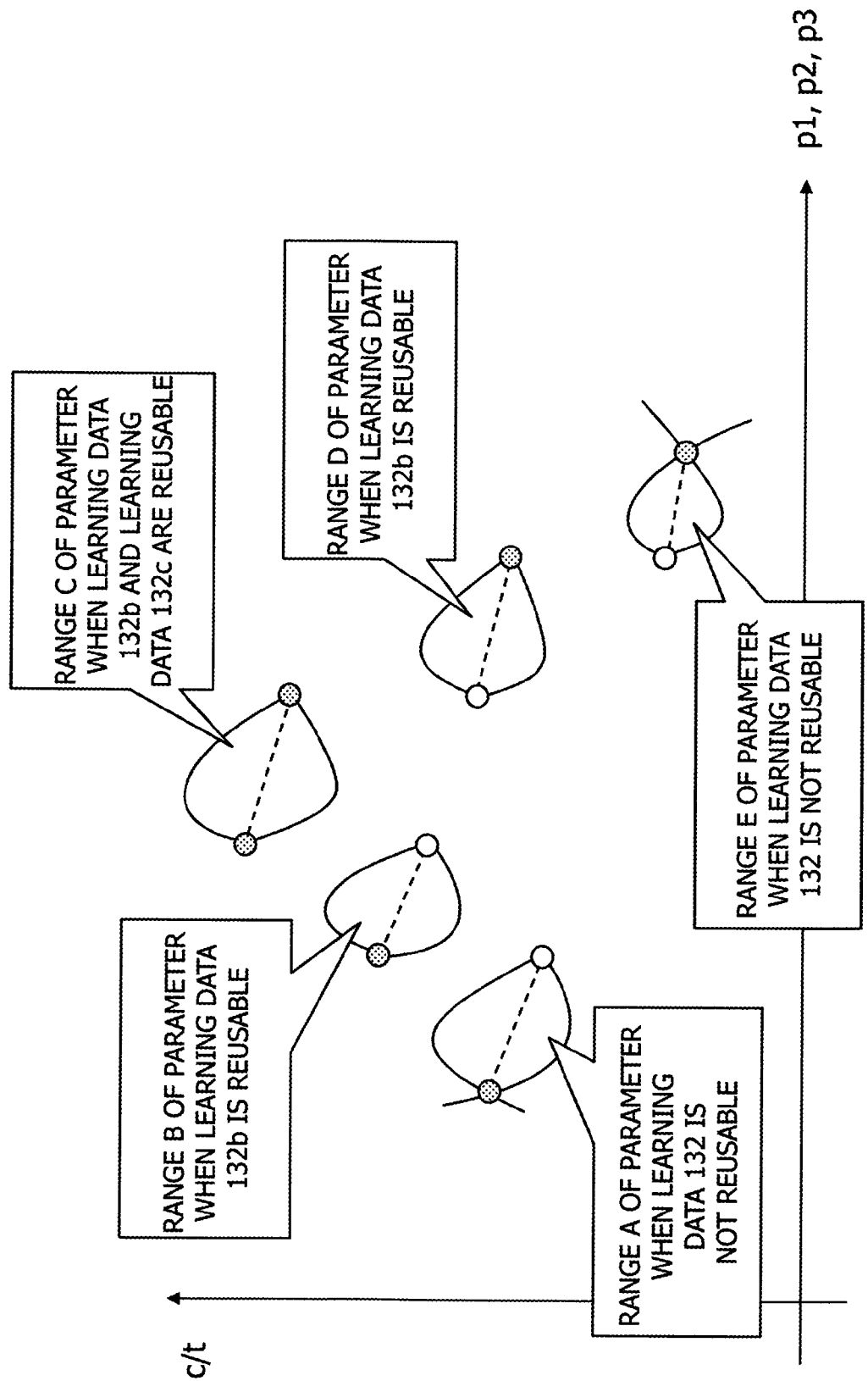
FIG. 23 is diagram for explaining details of the first embodiment.

Next, details of the first embodiment will be described. FIGS. 16 to 20 are flow charts for explaining details of the learning process according to the first embodiment. In addition, FIGS. 21 to 23 are diagrams for explaining details of the first embodiment. Details of the first embodiment illustrated in FIGS. 21 to 23 will now be described with reference to FIGS. 16 to 20. In a similar manner to FIG. 9, a graph illustrated in FIG. 23 is a graph of the percentage of correct answers per time c/t in a case where a combination of values of parameters p1, p2, and p3 is represented by an abscissa for the sake of convenience.

Figure 16:
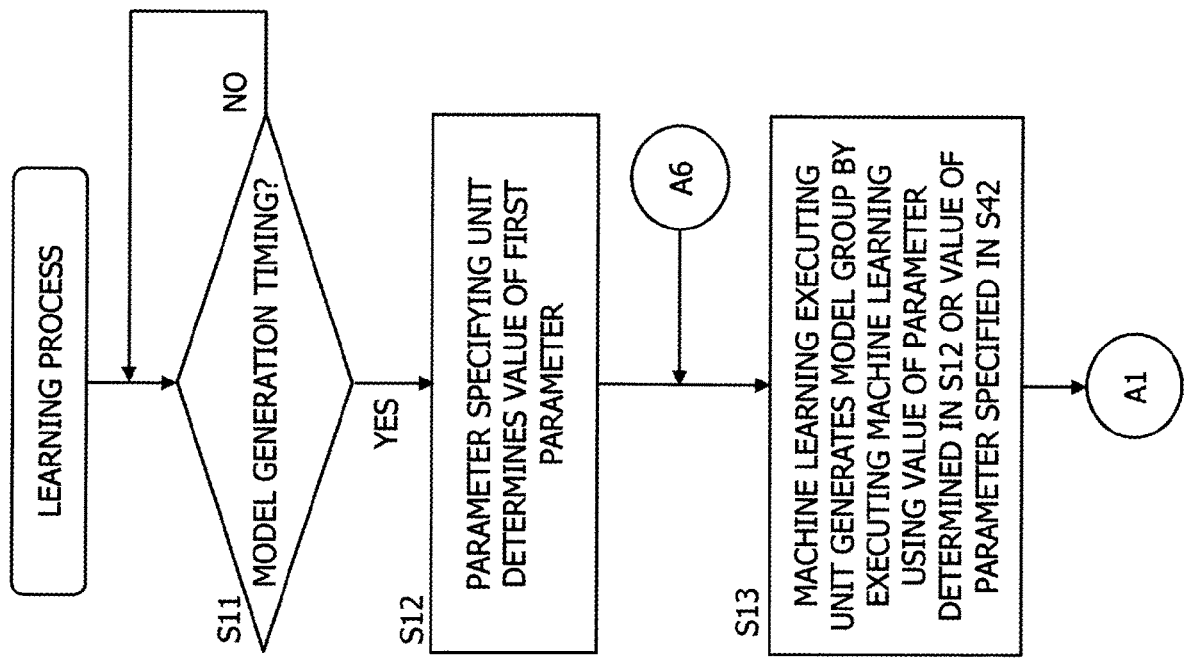
FIG. 16 is flow chart for explaining details of the learning process according to the first embodiment.

As illustrated in FIG. 16, the information receiving unit 111 of the information processing apparatus 1 stands by until a model generation timing arrives (NO in S11).

In addition, when the model generation timing arrives (YES in S11), the parameter specifying unit 115 determines a value of a first parameter p (S12). In this case, for example, the parameter specifying unit 115 may randomly determine the value of the first parameter p. Moreover, when there are a plurality of parameters p to be input when generating the model group mdg, the parameter specifying unit 115 determines a combination of values of the plurality of parameters p in the process of S12.

Subsequently, the machine learning executing unit 116 of the information processing apparatus 1 generates the model group mdg by executing machine learning using the value of the parameter p1 determined in the process of S12 or the value of the parameter p specified in a process of S42 (to be described later) (S13).

Figure 17:
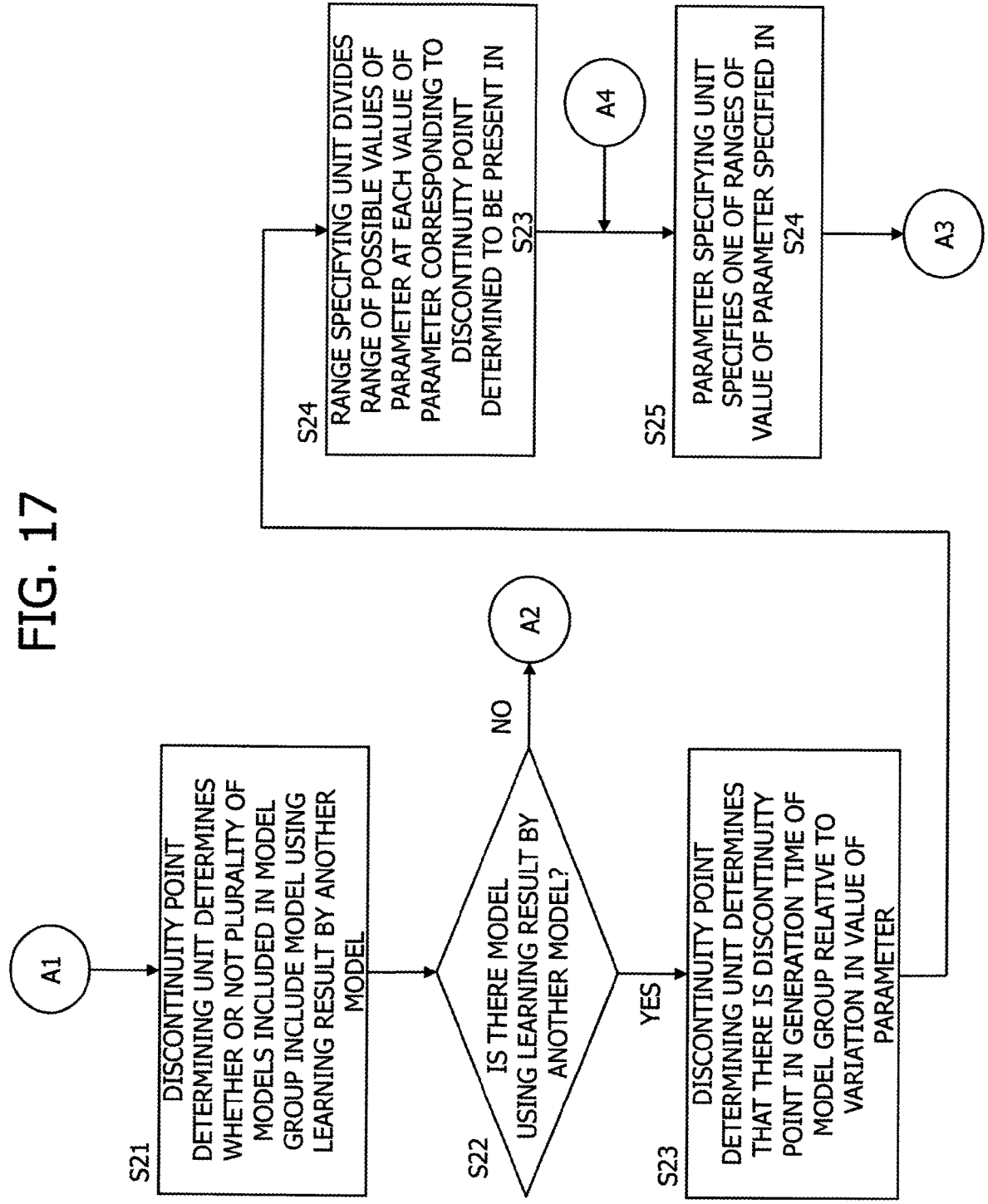
FIG. 17 is flow chart for explaining details of the learning process according to the first embodiment.

Next, as illustrated in FIG. 17, the discontinuity point determining unit 112 of the information processing apparatus 1 determines, for example, whether or not a plurality of models md included in the model group mdg generated by the information processing apparatus 1 include a model md using a learning result by another model md (S21). In other words, the discontinuity point determining unit 112 determines whether or not previously generated learning data 132 can be reused during generation of the model group mdg.

As a result, when the discontinuity point determining unit 112 determines that there is a model md using a learning result by another model md (YES in S22), the discontinuity point determining unit 112 determines that there is a discontinuity point in the generation time t of the model group mdg relative to a variation in the value of the parameter p (S23). In addition, the range specifying unit 113 divides a range of possible values of the parameter p at each value of the parameter p corresponding to the discontinuity point determined to be present in the process of S23 (S24).

Specifically, in the information processing apparatus 1, depending on a combination of the parameters p1, p2, and p3 to be input to the model group mdg, cases where only learning data 132b is reusable, cases where both the learning data 132b and learning data 132c are reusable, and cases where the learning data 132 is not reusable arise.

In addition, in these cases, as illustrated in FIG. 23, points between a range A of a value of each parameter p in the case where the learning data 132 is not reusable and a range B of a value of each parameter p in the case where the learning data 132b is reusable are discontinuity points. Furthermore, as illustrated in FIG. 23, points between the range B of a value of each parameter p in the case where the learning data 132b is reusable and a range C of a value of each parameter p in the case where both the learning data 132b and the learning data 132c are reusable are discontinuity points. In addition, as illustrated in FIG. 23, points between the range C of a value of each parameter p in the case where both the learning data 132b and the learning data 132c are reusable and a range D of a value of each parameter p in the case where the learning data 132b is reusable are discontinuity points. Furthermore, as illustrated in FIG. 23, points between the range D of a value of each parameter p in the case where the learning data 132b is reusable and a range E of a value of each parameter p in the case where the learning data 132 is not reusable are discontinuity points.

Therefore, in the process of S24, for example, the range specifying unit 113 specifies the range A, the range B, the range C, the range D, and the range E by dividing the range of the value of the parameter p according to each discontinuity point.

Moreover, in the example illustrated in FIG. 23, the expected improvement per time ei/t corresponding to the range C is highest, the expected improvement per time ei/t corresponding to the range B and the range D is next highest, and the expected improvement per time ei/t corresponding to the range A and the range E is lowest.

Subsequently, the parameter specifying unit 115 specifies one of the ranges of the value of the parameter p specified in the process of S24 (S25). Specifically, in the following process, the information processing apparatus 1 specifies a value of the parameter p at which the expected improvement per time ei/t is maximum in the range of the value of the parameter p specified in the process of S25.

Figure 18:
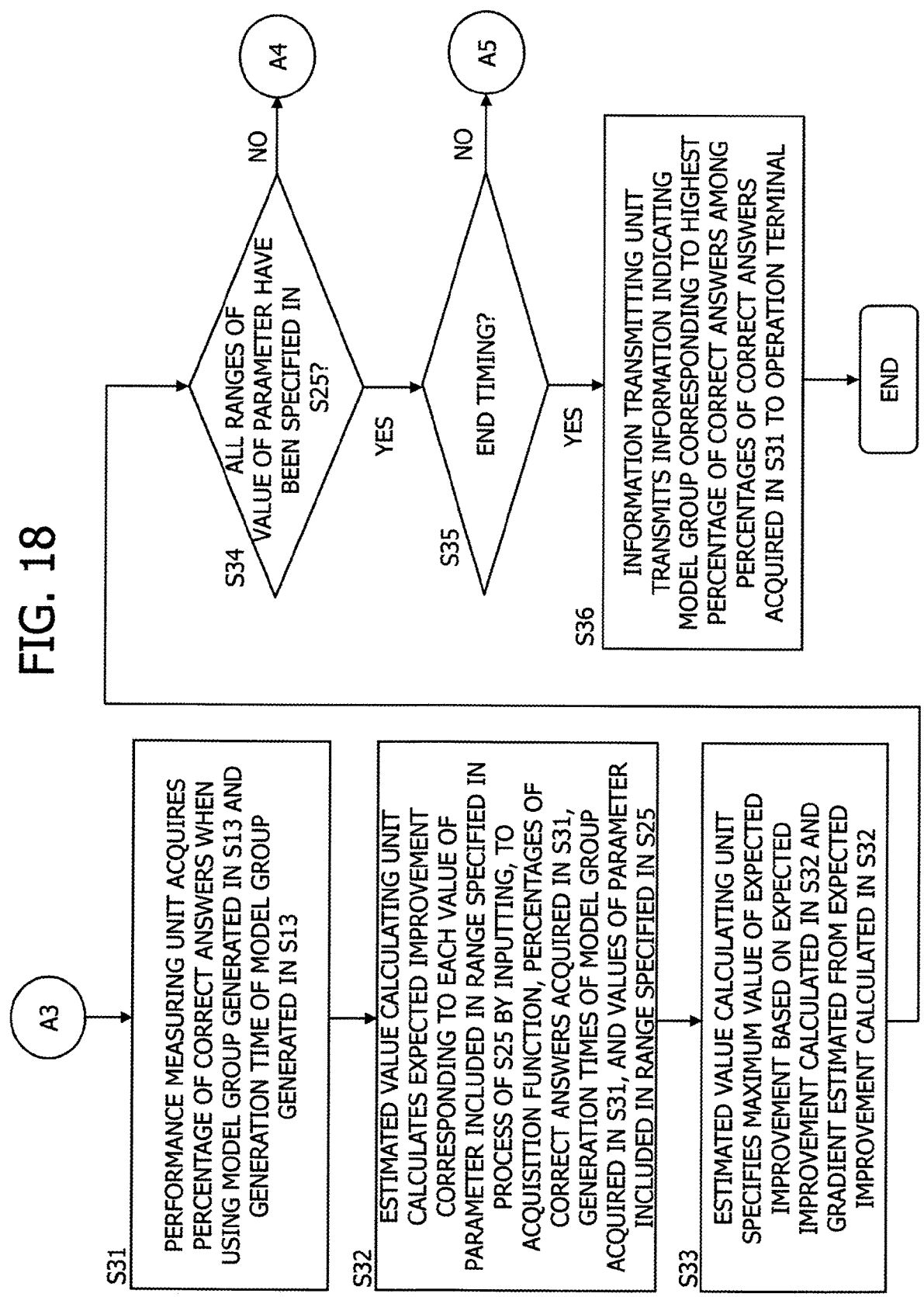
FIG. 18 is flow chart for explaining details of the learning process according to the first embodiment.

In addition, as illustrated in FIG. 18, the performance measuring unit 117 of the information processing apparatus 1 acquires the percentage of correct answers c when using the model group mdg generated in the process of S13 in the information processing system 10 and the generation time t of the model group mdg generated in the process of S13 (S31).

Specifically, the performance measuring unit 117 may acquire the percentage of correct answers c when using the model group mdg generated in the process of S13 by, for example, referring to information on percentage of correct answers 131a stored in the information storage area 130. In addition, the performance measuring unit 117 may acquire the generation time t of the model group mdg generated in the process of S13 by measuring the time from start to completion of the generation of the model group mdg generated in the process of S13. Hereinafter, a specific example of the information on percentage of correct answers 131a will be described.

Specific Example of Information on Percentage of Correct Answers

FIG. 21 is a diagram for explaining a specific example of the information on percentage of correct answers 131a.

The information on percentage of correct answers 131a illustrated in FIG. 21 includes, as items, an "item number" for identifying each piece of information included in the information on percentage of correct answers 131a, "question contents" in which is set contents of a question input to the model group mdg by the provider, and "answer contents" in which is set contents of an answer output by the model group mdg in response to the question of which contents are set in the "question contents". In addition, the information on percentage of correct answers 131a illustrated in FIG. 21 includes, as an item, "correct/incorrect" in which is set information indicating whether or not the contents set in the "answer contents" are correct as an answer to the contents set in the "question contents". For example, "O" indicating that the answer is correct or "X" indicating that the answer is not correct is set in "correct/incorrect".

Moreover, the information set in "question contents" in the information on percentage of correct answers 131a illustrated in FIG. 21 corresponds to, for example, information included in the first data set described with reference to FIG. 7. In addition, the information set in "answer contents" in the information on percentage of correct answers 131a illustrated in FIG. 21 corresponds to, for example, information included in the output data DT described with reference to FIG. 7.

Specifically, in the information on percentage of correct answers 131a illustrated in FIG. 21, in the piece of information of which the "item number" is "1", "Tell me the phone number of company A" is set as the "question contents", "03-xxxx-xxxx." is set as the "answer contents", and "O" is set as "correct/incorrect". In addition, in the information on percentage of correct answers 131a illustrated in FIG. 21, in the piece of information of which the "item number" is "3", "What OS is supported by a personal computer manufactured by company A?" is set as the "question contents", "B-OS." is set as the "answer contents", and "O" is set as "correct/incorrect".

On the other hand, in the information on percentage of correct answers 131a illustrated in FIG. 21, in the piece of information of which the "item number" is "4", "What is the postal code for company A?" is set as the "question contents", "B-OS." is set as the "answer contents", and "X" is set as "correct/incorrect". A description of other pieces of information included in FIG. 21 will be omitted.

In other words, "O", "O", "O", "X", and "O" are set in the field of "correct/incorrect" in the information on percentage of correct answers 131a illustrated in FIG. 21. Therefore, in the process of S31, for example, the performance measuring unit 117 acquires 80(%) as the percentage of correct answers c of the model group mdg.

Moreover, for example, the performance measuring unit 117 stores the performance information 131 including the percentage of correct answers c and the generation time t acquired in the process of S31 in the information storage area 130. Hereinafter, a specific example of the performance information 131 including the percentage of correct answers c and the generation time t acquired in the process of S31 will be described.

Specific Example of Performance Information (2)

FIG. 22 is a diagram for explaining a specific example of the performance information 131.

In the performance information 131 illustrated in FIG. 22, in a piece of information of which the "item number" is "1", "mdg1" is set as a "model group name", "p1, p2, p3" is set as the "parameter name", and "1, 2, 4" is set as the "value". In addition, in the performance information 131 illustrated in FIG. 22, in the piece of information of which the "item number" is "1", "14 (h)" is set as the "generation time" and "55(%)" is set as the "percentage of correct answers". A description of other pieces of information illustrated in FIG. 22 will be omitted.

Returning now to FIG. 18, the parameter specifying unit 115 calculates the expected improvement ei/t corresponding to each value of the parameter p included in the range specified in the process of S25 by inputting, to an acquisition function, all of the percentages of correct answers c previously acquired in the process of S31, all of the generation times t of the model group mdg previously acquired in the process of S31, and the values of the parameter p included in the range specified in the process of S25 (S32).

In addition, the estimated value calculating unit 114 of the information processing apparatus 1 specifies a maximum value of the expected improvement per time ei/t based on the expected improvement per time ei/t calculated in the process of S32 and a gradient estimated from the expected improvement per time ei/t calculated in the process of S32 (S33).

Subsequently, the parameter specifying unit 115 determines whether or not all ranges of the value of the parameter p have been specified in the process of S25 (S34).

As a result, when the parameter specifying unit 115 determines that all ranges of the value of the parameter p have not been specified (NO in S34), the parameter specifying unit 115 once again performs the processes of S25 and thereafter.

On the other hand, when the parameter specifying unit 115 determines that all ranges of the value of the parameter p have been specified (YES in S34), the parameter specifying unit 115 determines whether or not an end timing of the learning process has arrived (S35). Specifically, the parameter specifying unit 115 determines that the end timing of the learning process has arrived when, for example, a present time point exceeds an end time limit determined in advance or the number of times a value of the parameter p is specified in the process of S42 (to be described later) reaches a predetermined number of times.

Figure 19:
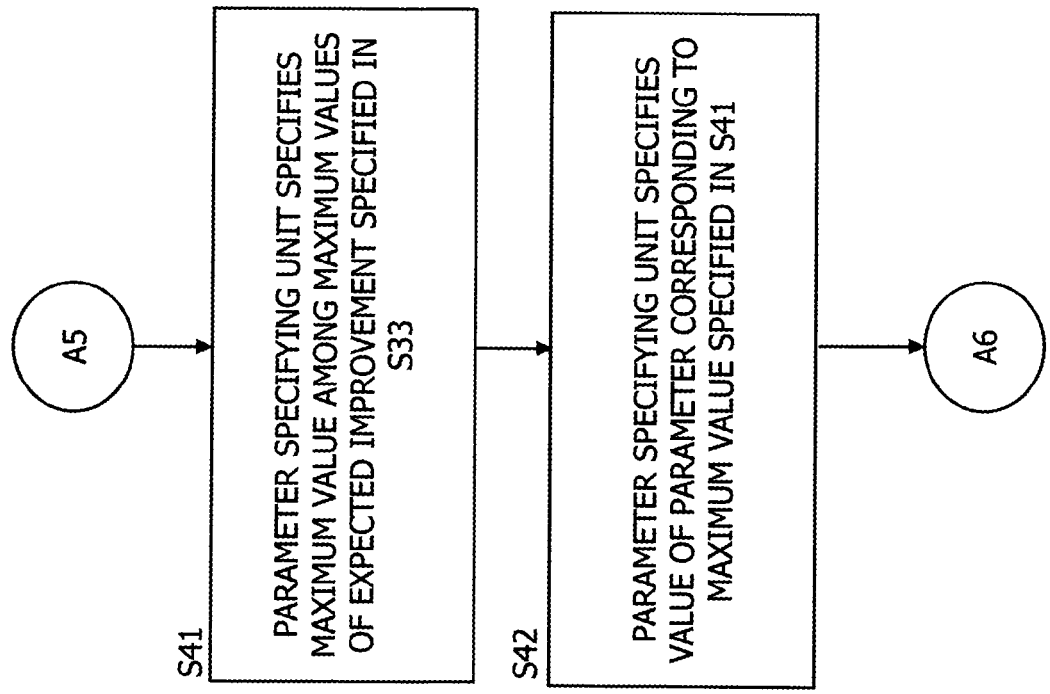
FIG. 19 is flow chart for explaining details of the learning process according to the first embodiment.

As a result, when the parameter specifying unit 115 determines that the end timing has not arrived (NO in S35), as illustrated in FIG. 19, the parameter specifying unit 115 specifies a maximum value of the expected improvement per time ei/t specified in the process of S33 (S41). In addition, the parameter specifying unit 115 specifies a value of the parameter p corresponding to the maximum value specified in the process of S41 (S42). Subsequently, the machine learning executing unit 116 once again performs the processes of S13 and thereafter.

In other words, when the generation time t of the model group mdg relative to a variation in the value of the parameter p is discontinuous, the information processing apparatus 1 specifies a maximum value of the expected improvement ei/t for each range divided by discontinuity points. In addition, the information processing apparatus 1 specifies a maximum value among the maximum values of the expected improvement ei/t specified for each range divided by discontinuity points as a maximum value of the expected improvement ei/t in all ranges of possible values of the parameter p.

Accordingly, even when there is a discontinuity point in the generation time t of the model group mdg relative to a variation in the value of the parameter p, the information processing apparatus 1 can calculate the expected improvement per time ei/t as a result of using an acquisition function in an appropriate manner.

On the other hand, when it is determined that the end timing has arrived in the process of S35 (YES in S35), the information transmitting unit 118 of the information processing apparatus 1 transmits information indicating a model group mdg corresponding to a highest percentage of correct answers c among the percentages of correct answers c acquired in the process of S31 (the percentages of correct answers c included in the performance information 131 stored in the information storage area 130) to the operation terminal 3 (S36). Specifically, for example, the information transmitting unit 118 refers to the performance information 131 described with reference to FIG. 22 and transmits "mdg2" which is a piece of information set in the "model group name" of a piece of information of which a piece of information set in the "percentage of correct answers" represents the highest percentage of correct answers (the piece of information of which the "item number" is "2").

Figure 20:
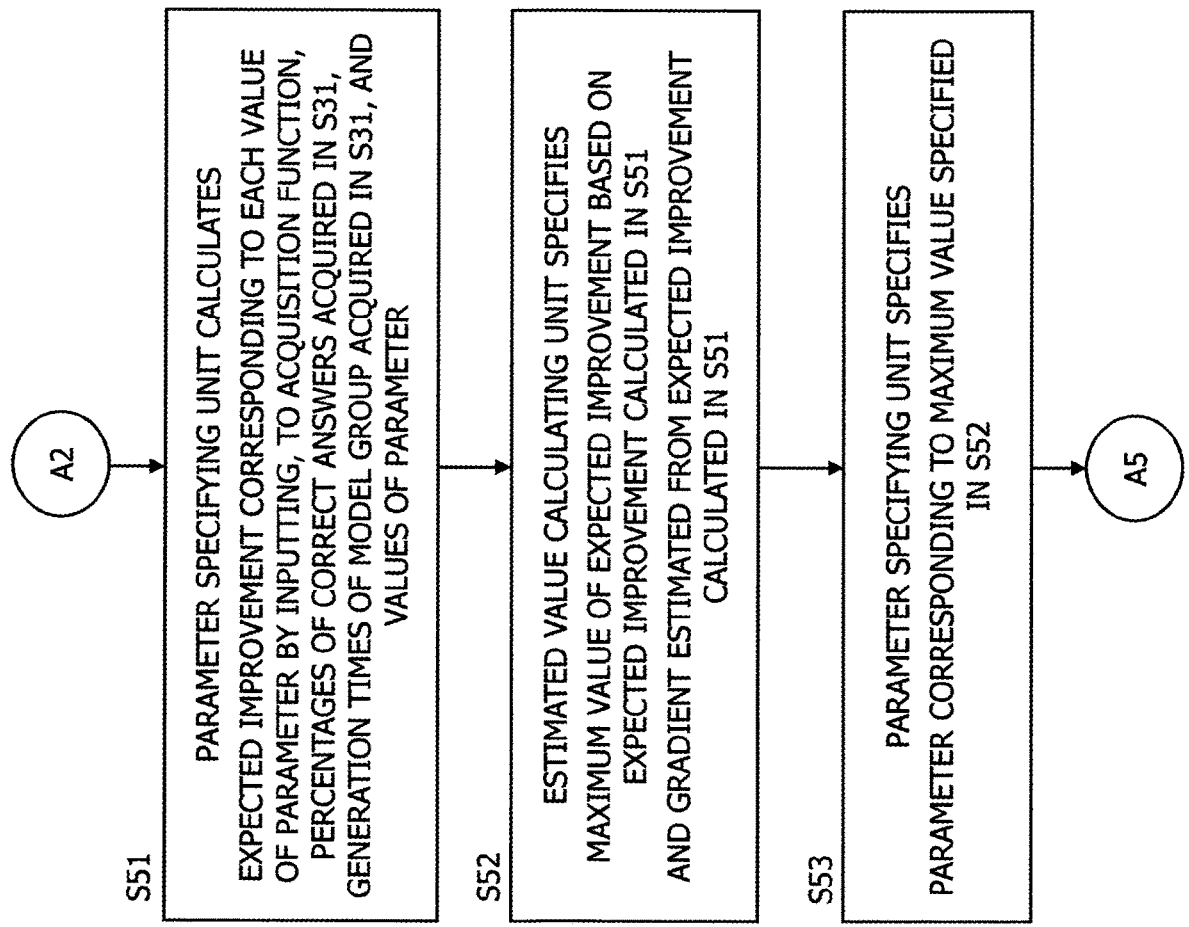
FIG. 20 is flow chart for explaining details of the learning process according to the first embodiment.

In addition, when it is determined that there is no model md using a learning result by another model md in the process of S22 (NO in S22), as illustrated in FIG. 20, the parameter specifying unit 115 calculates the expected improvement ei/t corresponding to each value of the parameter p by inputting, to an acquisition function, all of the percentages of correct answers c previously acquired in the process of S31, all of the generation times t of the model group mdg previously acquired in the process of S31, and the values of the parameter p (S51).

Furthermore, the estimated value calculating unit 114 specifies a maximum value of the expected improvement per time ei/t based on the expected improvement per time ei/t calculated in the process of S51 and a gradient estimated from the expected improvement per time ei/t calculated in the process of S51 (S52).

Subsequently, the parameter specifying unit 115 specifies a value of the parameter p corresponding to the maximum value specified in the process of S52 (S53).

Accordingly, even when there is no discontinuity point in the generation time t of the model group mdg relative to a variation in the value of the parameter p, the information processing apparatus 1 can similarly calculate the expected improvement per time ei/t as a result of using an acquisition function in an appropriate manner.

As described above, the information processing apparatus 1 according to the present embodiment receives a plurality of pieces of performance information 131 respectively including a value of the parameter p and a generation time t of the model group mdg as a result of inputting a value of the parameter p.

In addition, based on the plurality of pieces of received performance information 131, the information processing apparatus 1 determines whether or not there is a discontinuity point at which a variation in the generation time t of the model group mdg relative to a variation in the value of the parameter p is discontinuous. As a result, when the information processing apparatus 1 determines that there is a discontinuity point, based on the discontinuity point, the information processing apparatus 1 specifies a range of the value of the parameter p in which the variation in the generation time t of the model group mdg relative to the variation in the value of the parameter p is continuous.

Subsequently, for each specified range of the value of the parameter p, the information processing apparatus 1 calculates an expected improvement per time ei/t of the percentage of correct answers c when using the model group mdg per the generation time t of the model group mdg using the value of the parameter p included in the range. In addition, the information processing apparatus 1 specifies a value of the parameter p which causes any estimated value selected in accordance with a magnitude of the estimated value to be obtained among the calculated estimated values. Subsequently, the information processing apparatus 1 generates the model group mdg using the specified value of the parameter p.

In other words, when the information processing apparatus 1 determines that there is a discontinuity point in the generation time t of the model group mdg relative to a variation in the value of the parameter p, the information processing apparatus 1 divides the range of possible values of the parameter p into respective ranges of the value of the parameter p in which the variation in the generation time t of the model group mdg is continuous. In addition, for example, for each divided range of the value of the parameter p, the information processing apparatus 1 calculates the expected improvement per time ei/t using an acquisition function and determines the value of the parameter p corresponding to a maximum value among the calculated expected improvements per time ei/t as the value of the parameter p input to the model group mdg to be generated next.

Accordingly, the information processing apparatus 1 enables an appropriate value of the parameter p used to generate the next model group mdg to be specified in an efficient manner even when there is a discontinuity point of the generation time t of the model group mdg relative to a variation in the value of the parameter p.

According to an aspect, an appropriate value of a parameter used to generate a model can be specified in an efficient manner.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing therein a machine learning program that causes a computer to execute a process comprising:
   receiving a plurality of pieces of performance information respectively including a learning parameter included in a machine learning model and a learning time spent for training of the machine learning model based on a first value of the learning parameter;
   calculating an expected improvement per time using an acquisition function based on a Gaussian process using the plurality of pieces of performance information;
   determining, when the training of the machine learning model based on the learning parameter included in the plurality of pieces of performance information includes using a result of a previous training of the machine learning model based on the learning parameter, whether or not there is a discontinuity point at which a variation in the learning time relative to a variation in the learning parameter is discontinuous;

specifying, when the discontinuity point is present, ranges of the learning parameter in which the variation in the learning time relative to the variation in the learning parameter is continuous, based on the discontinuity point;

specifying, for each of the specified ranges, accuracy of the machine learning model obtained by training based on the first value of the learning parameter included in the specified ranges;

calculating, for each of the specified ranges, a magnitude of an expected improvement per time using the acquisition function when training of another machine learning model for the specified accuracy with respect to a learning time spent for the training of the machine learning model as an estimation value of the machine learning model;

specifying the estimation value whose magnitude meets a prescribed condition among a plurality of estimation values for each of the calculated estimation value;

selecting a second value of the learning parameter within a range corresponding to the specified estimation value in accordance with a magnitude of each of the calculated estimation value; and training the other machine learning model based on the second value of the learning parameter.

2. The non-transitory computer-readable storage medium according to claim 1, wherein the result is learning data generated from the learning parameter included in the machine learning model learned by previous training of the machine learning model based on the learning parameter.

3. The non-transitory computer-readable storage medium according to claim 1, wherein
the specifying ranges of the learning parameter includes dividing the ranges of the learning parameter at each of the discontinuity points.

4. The non-transitory computer-readable storage medium according to claim 1, wherein
the selecting the second value of the learning parameter includes selecting the second value of the learning parameter which causes the estimation value satisfying prescribed conditions among the estimated values to be obtained.

5. The non-transitory computer-readable storage medium according to claim 4, wherein
the selecting the second value of the learning parameter includes selecting the second value of the learning parameter which causes a largest estimation value among the estimation values to be obtained.

6. A machine learning apparatus comprising:
a processor that executes a process including:
receiving a plurality of pieces of performance information respectively including a learning parameter included in a machine learning model and a learning time spent for training of the machine learning model based on a first value of the learning parameter;
calculating an expected improvement per time using an acquisition function based on a Gaussian process using the plurality of pieces of performance information;
determining, when the training of the machine learning model based on the learning parameter included in the plurality of pieces of performance information includes using a result of a previous training of the machine learning model based on the learning parameter, whether or not there is a discontinuity point at which a variation in the learning time relative to a variation in the learning parameter is discontinuous;

specifying, when the discontinuity point is present, ranges of the learning parameter in which the variation in the learning time relative to the variation in the learning parameter is continuous, based on the discontinuity point;

specifying, for each of the specified ranges, accuracy of the machine learning model obtained by training based on the first value of the learning parameter included in the specified ranges;

calculating, for each of the specified ranges, a magnitude of an expected improvement per time using the acquisition function when training of another machine learning model for the specified accuracy with respect to a learning time spent for the training of the machine learning model as an estimation value of the machine learning model;

specifying the estimation value whose magnitude meets a prescribed condition among a plurality of estimation values for each of the calculated estimation value;

selecting a second value of the learning parameter within a range corresponding to the specified estimation value in accordance with a magnitude of each of the calculated estimation value; and training the other machine learning model based on the second value of the learning parameter.

7. A machine learning method comprising:
receiving, by a processor, a plurality of pieces of performance information respectively including a learning parameter included in a machine learning model and a learning time spent for training of the machine learning model based on a first value of the learning parameter;
calculating an expected improvement per time using an acquisition function based on a Gaussian process using the plurality of pieces of performance information;
determining, by a processor, when the training of the machine learning model based on the learning parameter included in the plurality of pieces of performance information includes using a result of a previous training of the machine learning model based on the learning parameter, whether or not there is a discontinuity point at which a variation in the learning time relative to a variation in the learning parameter is discontinuous;

specifying, by a processor, when the discontinuity point is present, ranges of the learning parameter in which the variation in the learning time relative to the variation in the learning parameter is continuous, based on the discontinuity point;

specifying, by a processor, for each of the specified ranges, accuracy of the machine learning model obtained by training based on the first value of the learning parameter included in the specified ranges;

calculating, by a processor, for each of the specified ranges, a magnitude of an expected improvement per time using the acquisition function when training of another machine learning model for the specified accuracy with respect to a learning time spent for the training of the machine learning model as an estimation value of the machine learning model;

specifying, by a processor, the estimation value whose magnitude meets a prescribed condition among a plurality of estimation values for each of the calculated estimation value;

selecting, by a processor, a second value of the learning parameter within a range corresponding to the specified estimation value in accordance with a magnitude of each of the calculated estimation value; and training the other machine learning model based on the second value of the learning parameter.

* * * * *